United States Patent [19]

Rufer et al.

[11] 3,721,668
[45] March 20, 1973

[54] NOVEL 5-NITRO-IMIDAZOLE ANTIMICROBIALLY EFFECTIVE COMPOUNDS

[75] Inventors: Clemens Rufer; Rudolf Albrecht; Hans-Joachim Kessler; Eberhard Schroder, all of Berlin, Germany

[73] Assignee: Schering Aktiengesellschaft, Berlin, Germany

[22] Filed: July 8, 1970

[21] Appl. No.: 53,298

[30] Foreign Application Priority Data

July 10, 1969 Germany.....................P 19 35 685.5

[52] U.S. Cl.............260/240 J, 424/248, 424/250, 424/273, 260/240 A, 260/247.7 E, 260/268 BC, 260/293.8, 260/309, 260/326.8, 260/456 P, 260/456 R
[51] Int. Cl..............................................C07d 49/36
[58] Field of Search.....260/240 J, 309, 240 R, 240 A

[56] References Cited

UNITED STATES PATENTS 3,475,421  10/1969  Chretien et al.....................260/240 J
3,565,892  2/1971  Asato et al.........................260/240 D

FOREIGN PATENTS OR APPLICATIONS 25,256  11/1965  Japan.........................260/240 A

OTHER PUBLICATIONS

Corvaiser, Bull. Soc. Chim. France 1962, pages 528 to 535
Albrecht et al., Annalen Der Chemie, vol. 736, pages 110 to 125 (June 1970)
Hubbal et al., J. Chem. Soc., 1929, pages 21 to 32

Primary Examiner—John D. Randolph
Attorney—Millen, Raptes & White

[57] ABSTRACT

5-Nitro-imidazoles of the formula

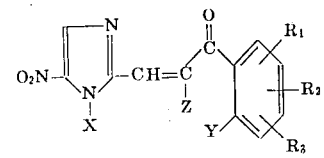

wherein X is hydrocarbon or a free or esterified hydroxy group; Y and Z each are H or, collectively, a bridging group consisting of —$CH_2$— and/or one of O, S, SO and $SO_2$, —$CH_2CH_2$—, or —CHA— wherein A is —$CH_3$, —$C_2H_5$ or —$C_6H_5$; $R_1$ and $R_2$ each are alkyl, halogen or free, esterified or etherified —OH; and $R_3$ is H, alkyl, substituted alkyl, halogen, free, esterified or etherified —OH, amino, amido or aminoalkoxy; have antibacterial and antifungal activity, particularly against protozoa and especially against *Trichomonas vaginalis*.

47 Claims, No Drawings

NOVEL 5-NITRO-IMIDAZOLE ANTIMICROBIALLY EFFECTIVE COMPOUNDS

BACKGROUND OF THE INVENTION

This invention relates to novel 5-nitro-imidazoles.

The effectiveness of nitroimidazoles against trichomonads has been known since the discovery of the antibiotic azamycin (2-nitroimidazole, S. Nakamura and H. Umezawa, J. Antibiotics (Tokyo), 9 A, 66 [1955]). However, these and other 2-nitroimidazoles have proved to be of relatively limited usefulness. See G. C. Lancini, E. Lazzari, R. Pallanea, "Il Farmaco Ed. Sc." 21, 278 (1966). As the best among a large number of synthesized compounds (C. Cosar, "Arzneimittelforschung" [Drug Research] 16, 23 [1966]), only the commercial preparation metronidazole (1-(2-hydroxyethyl)-2-methyl-5-nitroimidazole; see, e.g., French Pat. No. 1,212,028) has evolved from the 5-nitroimidazoles.

It has now been found that the condensation products as defined herein of the 1-substituted 5-nitro-2-imidazolyl aldehydes with ketones containing active methylene groups exhibit a far stronger activity against *Trichomonas vaginalis* than metronidazole. Moreover, they exhibit antibacterial and antifungal effectiveness and are also active against other protozoa.

SUMMARY OF THE INVENTION

The compounds of this invention can be represented by the formula

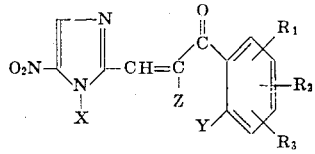

wherein X is a saturated or unsaturated hydrocarbon group containing one to five carbon atoms or free or esterified 2-hydroxyethyl group;

Y and Z each are hydrogen atoms or, collectively, a ring-forming (a) $-CH_2-$, (b) one of $-O-$, $-S-$, $-SO-$ and $-SO_2-$, (c) a combination of (a) and (b), (d) $-CH_2-CH_2-$, or (e) $-CHA-$ wherein A is $-CH_3$, $-C_2H_5$ or $-C_6H_5$; $R_1$, $R_2$ and $R_3$ each are H, alkyl containing one to five carbon atoms, halogen, or a free, esterified or etherified hydroxy group; and, additionally, $R_3$ can be the corresponding alkyl substituted in the terminal position by halogen or a free, esterified or etherified hydroxy group as defined herein, or a primary, secondary or tertiary amino or aminoalkoxy group or an amido group, and the acid addition salts and the quaternary ammonium salts thereof.

DETAILED DISCUSSION

In the compounds of Formula I, X can be saturated or unsaturated. Examples of X which are saturated hydrocarbon are methyl, ethyl, isopropyl, butyl, sec.-butyl, iso-butyl, tert.-butyl, hexyl, heptyl, octyl, nonyl and decyl. Examples of unsaturated hydrocarbon are ethenyl, ethynyl, allyl, propynyl, 1-methylallyl, crotyl, butadienyl, 2-octenyl, 6-octenyl, etc. Preferred are those containing 1–4 carbon atoms and a single unsaturation, preferably a double bond in the β-position.

When X is a 2-hydroxyethyl group in the compounds of this invention, the $-OH$ group can be free or esterified to form a benzoyloxyethyl or an alkanoyloxyethyl group of the formula alkyl $-COOCH_2CH_2-$ containing one to five carbon atoms in the alkyl group.

Y and Z can each be a hydrogen atom, or collectively, a bridging, ring-forming group containing one or two ring members which are $-O-CH_2-$, $-CH_2-O-$, $-SO-CH_2-$, $-SO_2-CH_2-$, $-CH_2-SO-$, $-CH_2-SO_2-$, $-CH_2-$, $-O-$, $-S-$, $-SO-$, $-SO_2-$, $-S-CH_2-$, $-CH_2-S-$, $-CH_2-CH_2-$, $-CH(CH_3)-$, $-CH(C_2H_5)-$ or $-CH(C_6H_5)-$.

In the compounds of this invention $R_1$, $R_2$ and $R_3$ each can be H, an alkyl group of one to five carbon atoms as illustrated above for X, halogen, viz., Cl, Br, I or F, or a free, esterified or etherified $-OH$ group. Additionally, $R_3$ can be a primary, secondary or tertiary amino, amido, aminoalkoxy or amidoalkoxy group.

When $R_1$ or $R_2$ is an etherified $-OH$ group, the ether group can be alkoxy containing one to five carbon atoms, e.g., methoxy, ethoxy, propoxy, isopropoxy, butoxy, tertiary-butoxy, amyloxy, and the like or other ether group as illustrated hereinafter for $R_3$.

When $R_1$ or $R_2$ is an esterified $-OH$ group, the ester group can be an acyloxy group of the formula alkyl $-COO-$ containing one to five carbon atoms in the alkyl group or other esterified hydroxy group illustrated hereinafter for $R_3$.

When $R_3$ is an esterified hydroxy group, the ester group can be an ester of an aliphatic or aromatic carboxylic or sulfonic acid containing one to 10 carbon atoms, such as, for example, acetic acid, butyric acid, benzoic acid, cinnamic acid, methanesulfonic acid, p-toluenesulfonic acid, or butane-sulfonic acid.

Other examples of esterified hydroxy $R_3$ groups are those in which the ester group is acyloxy wherein the acyl group is the acyl radical of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, acyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 3-methyl-α-naphthoic, an aralkyl acid, e.g., phenylacetic, phenylpropionic, a dibasic acid, e.g., succinic, glutaric, α-methylglutaric, β-methylglutaric, β,β-dimethylglutaric, adipic, pimelic, suberic, a hydroxy acid, e.g., glycolic, lactic, citric, tartaric, d-maleic, d-glyceric, mannonic, gluconic, salicylic, an amino acid, e.g., glycine, diglycollamic, triglycollamic, methylglycine, dimethylglycine, diethylglycine, para-aminosalicylic, para-aminobenzoic, other heterosubstituted acids, e.g., ethylmercaptoacetic, benzylmercaptoacetic, cyannoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e.g., carbamic acid, phenylcarbamic, n-butylcarbamic, dimethylcarbamic, diethylcarbamic, allophanic, or a heterocyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic and pyrrolyl-2-carboxylic acid.

Other examples of esterified $R_3$—OH groups in which the ester is a sulfonyloxy group are those in which the sulfonyl group is arylsulfonyl, e.g., benzenesulfonyl, m,m'-dimethylbenzenesulfonyl, o,o'-dimethylbenzenesulfonyl, sym.-trimethylbenzenesulfonyl, sym.-triethylbenzenesulfonyl, m-ethylbenzenesulfonyl, para-isopropylbenzenesulfonyl, m-n-butylbenzenesulfonyl, or is alkylsulfonyl, e.g., ethylsulfonyl, propylsulfonyl, isopropylsulfonyl, butylsulfonyl, tert.-butylsulfonyl, isoamylsulfonyl, hexylsulfonyl, heptylsulfonyl, octylsulfonyl, or heterocyclic sulfonyl, e.g., α-pyridinesulfonyl, α-pyrane-sulfonyl, α-thiophenesulfonyl, α-furansulfonyl, α-tetrahydrofuransulfonyl, or other alkyl-, carbocyclic and heterocyclic aryl-, alkaryl- and aralkyl-sulfonyl group, preferably one containing 1–8 carbon atoms and 0–2, preferably 0–1 N, S or O hetero atoms, which are preferably ring carbon atoms, in the heterocyclic ring (R' group).

When $R_3$ is an etherified hydroxy group, the etherifying group can be alkyl containing one to five carbon atoms, e.g., methyl, ethyl, propyl, isopropyl, butyl, isobutyl, tert.-butyl, iso-amyl and amyl, alkenyl, e.g., allyl or aralkyl, e.g., benzyl.

In the compounds of this invention $R_3$ can also be a primary, secondary or tertiary amino group or aminoalkoxy group.

Preferred N-substituted amino groups are mono- and dialkylamino groups wherein each alkyl group contains one to five carbon atoms, e.g., methylamino, ethylamino, n-propylamino, isopropylamino, butylamino, isobutylamino, amylamino, dimethylamino, methylethylamino, diethylamino, methyl-n-propylamino, dipropylamino, diisopropylamino, methyl-isobutylamino, di-n-butylamino and methylamylamino.

Other examples of substituted amino are those wherein the amino nitrogen atom is mono-substituted or disubstituted with saturated hydrocarbon other than alkyl, or unsaturated hydrocarbon, containing one to five carbon atoms or, together with the N-atom, forms a heterocyclicamino substituent containing, e.g., four to 14, preferably four to six carbon atoms and one to three, preferably one or two heteroatoms including the amino nitrogen atom and zero to three, preferably zero to one rings, which substituent can be substituted by one or more alkyl groups of one to five carbon atoms, and contain a N-, O- or S-atom in addition to the amino nitrogen atom as a ring member, e.g., pyrrolidino, 2-methylpyrrolidino, 2,5-dimethylpyrrolidino, 3-ethylpyrrolidino, piperidino, homopiperidino, morpholino, imidazole, triazole, tetrazole, oxazole, dioxazole, isothiazole, pyridazine, pyrimidine, piperazine, isoxazine, morpholine, indole, benzoxazine, anilino, N-lower-alkylanilino, benzylamino, N-lower-alkyl-benzylamino, o-toluidino, p-toluidino and N-lower-alkyl-phenylethylamino.

$R_3$ can also be a corresponding amido group, e.g., an acylated or sulfonylated amino group, e.g., wherein the acyl or sulfonyl group is acetyl-, propionyl-, butyryl-, methanesulfonyl-, benzenesulfonyl-, toluenesulfonyl or other acyl or sulfonyl group as defined hereinabove.

$R_3$ can also be an aminoalkoxy group wherein the alkoxy group contains two to five carbon atoms, preferably two, and the amino group is a primary, secondary or tertiary amino group as defined above.

Preferred of the N-substituted aminoalkoxy groups are saturated and unsaturated mono- and dialkylaminoethoxy, free and esterified mono- and di-(hydroxyalkyl)-aminoethoxy, mono- and di-(acyloxyalkyl)-aminoethoxy, mono- and dicycloalkylaminoethoxy, pyrrolidinoethoxy, piperidinoethoxy, hexa-, octa, and decamethyleniminoethoxy, piperazinoethoxy, and morpholinoethoxy wherein the alkyl groups contain one to five carbon atoms and the cycloalkyl group contains five or six carbon atoms. The cyclic-amino groups can be substituted on a ring carbon atom and the N'-amino nitrogen atom, in the case of the piperazine ring, by alkyl, hydroxy, acyloxy, acyl, hydroxyalkyl, or acyloxyalkyl containing one to five carbon atoms in the alkyl and/or acyl groups, and can be bridged directly or via an alkylene group.

The following are preferred classes of compounds of this invention defined by Formula I:

a. X = alkyl containing one to four carbon atoms, preferably $CH_3$,
b. X = allyl,
c. Y and Z are —$CH_2$—, i.e., 1-indanones;
d. Y and Z are —$CH_2CH_2$—, i.e., 1-tetralones;
e. Y and Z are O, i.e., 3-benzofuranones;
f. Y and Z are —$CH_2$—S—, i.e., 4-thiachromanones;
g. Y and Z are H, i.e., acetophenones;
h. at least one, preferably one or two of $R_1$, $R_2$ and $R_3$ are H;
i. one or two of $R_1$, $R_2$ and $R_3$ is H and the remainder are free, esterified or etherified hydroxy, preferably wherein any esterified hydroxy is acetoxy and any etherified hydroxy is lower-alkoxy, especially methoxy, or β-tert.-aminoethoxy, β-hydroxyethoxy or β-acyloxyethoxy;
j. combinations of (c), (d), (e), (f) and (g) with one or both of (a) and (h) or (i);
k. pharmaceutically acceptable, i.e., physiologically acceptable, acid addition salts of each of the above classes of compounds, especially hydrochlorides.

The compounds of this invention are preferably isolated and administered in the form of an acid addition salt, e.g., inorganic acids, including hydrochloric acid, hydrobromic acid, nitric acid, sulfuric acid, phosphoric acid, organic acids, including lactic acid, acetic acid, propionic acid, citric acid, benzoic acid, succinic acid, heptagluconic acid, etc. Preferred are the pharmaceutically acceptable acid addition salts, i.e., those formed with acids which do not materially increase the toxicity of the free base form thereof. However, acid addition salts of toxic acids, e.g., perchloric, picric, etc., can be used for isolation, purification and/or characterization purposes and are also embraced within the scope of this invention.

Quaternary ammonium salts of the compounds of this invention formed by reaction with e.g., an alkyl halide, aralkyl halide, dialkyl sulfate, alkyl sulfonate, preferably lower-alkyl halides, also possess activity against trichomonas vaginalis and are included within the scope of this invention. When a compound of this invention possesses two basic amino groups, obviously the quaternary ammonium form of both amino groups can be formed. Examples of quaternary ammonium groups are trimethylammonium iodide, trimethylammonium sulfate, ethyldimethylammonium bromide, benzyldimethylammonium chloride, N-methyl-pyrrolidinium iodide and other, e.g., lower-alkyl ammonium chlorides, bromides, iodides and sulfates of the free base form of the compounds of this invention described in the examples which follow.

The novel compounds can be prepared by the following methods:

(a) An aldehyde of the formula

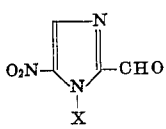

wherein X has the values given above, or a functional derivative of the aldehyde, is reacted with a compound of the formula

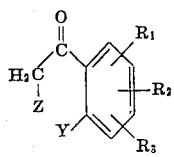

wherein Y, Z, $R_1$, $R_2$ and $R_3$ have the values given above, and thereafter a free hydroxyl or amino group is optionally acylated or sulfonylated; or acylated or sulfonylated products are saponified; or a hydroxyl group is exchanged for a halogen atom; or sulfonyloxy or halogen compounds are reacted with primary or secondary amines, and/or optionally, the amino compounds are converted into the salts thereof with organic or inorganic acids, with alkyl halides, dialkyl sulfates, or alkyl sulfonates;

(b) a compound of the formula

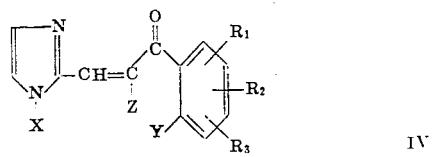

wherein X, Y, Z, $R_1$, $R_2$ and $R_3$ have the values given above, is nitrated;

(c) a product of (a) or (b) when Y and Z collectively are a ring-forming $-SO-$, $-SO_2-$, $-SO-CH_2-$, $-SO_2-CH_2-$, $-CH_2-SO-$, or $-CH_2-SO_2-$bridge, is produced by oxidizing a compound of the formula

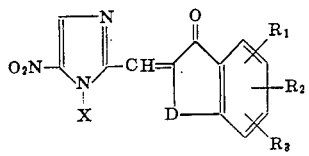

wherein X and $R_1$, $R_2$ and $R_3$ have the values given above and D represents one of the groups $-S-$, $-S-CH_2-$ and $-CH_2-S-$, so as to convert the thio group to a sulfoxide or sulfonyl compound.

The process according to (a) can be conducted at room temperature or at an elevated temperature in a acidic reaction medium, preferably in the anhydride of an aliphatic carboxylic acid of 1–5 carbon atoms or in glacial acetic acid in the presence of concentrated sulfuric acid. The condensation can also be conducted in HCl-containing ethanol, in formic acid, in orthophosphoric acid, and in piperidine/glacial acetic acid. Any acylation of hydroxyl groups or amino groups occurring during the reaction can, if desired, be reversed by saponification. On the other hand, the preparation of acylated products can be conducted by effecting the condensation in the presence of the anhydride of the acid desired for the acylation when the acid is aliphatic and contains 1–6 carbon atoms, or by reacting free hydroxyl or amino groups with the corresponding acid chloride and anhydride, respectively. Products in which $R_3$ is an aminoalkoxy group can also be obtained by reacting the corresponding tosyloxy or halogen compound of Formula I with an amine, the halogen compounds preferably being prepared from the corresponding hydroxyl compounds with halogenating agents, such as, for example, thionyl chloride or bromide.

The salt formation of the compounds containing amino groups can likewise be conducted subsequently, as in process (a).

Preferred functional derivatives of the starting aldehydes (II) are the diacetates.

The nitration according to process (b) can be conducted in accordance with the conventional methods, for example, with nitric acid in concentrated sulfuric acid or in the presence of the $BF_3-N_2O_4$ complex. Process (b) generally, gives less satisfactory results than process (a).

The oxidation of the sulfur atom, according to process (c), to the sulfoxide or sulfone can be conducted, for example, with hydrogen peroxide or an organic peracid.

The novel compounds exhibit good antibacterial and antifungal effects and are especially effective against protozoa and, among the latter, specifically effective against Trichomonas vaginalis. Table I illustrates the superior effect of the compounds of this invention against Trichomonas vaginalis, compared to the conventional commercial preparation metronidazole used in trichomoniasis. (This compound is described in French Pat. No. 1,212,028, published on Mar. 21, 1960. With respect to the effectiveness of this compound and numerous other 5-nitroimidazoles, none of which was more active than the former, see C. Cosar, "Arzneimittelforschung" [Drug Research] 16, 23 [1966]).

TABLE I

| Compound | Minimum Inhibitory Concentration in γ/ml. Against Trichomonas vaginalis |
|---|---|
| 6,7-Dimethoxy-2-(5-nitro-1-methyl-2-imidazolyl-methylene)-3-benzofuranone | 0.024 |
| 6-Hydroxy-2-(5-nitro-1-methyl-2-imidazolyl-methylene)-1-tetralone | 0.024 |
| 6-Acetoxy-5-methoxy-2-(5-nitro-1-methyl-2-imidazolyl-methylene)-1-indanone | 0.012 |
| 5-Acetoxy-2-(5-nitro-1-allyl-2-imidazolyl-methylene)-1-indanone | 0.024 |
| 4,5-Dimethoxy-2-(5-nitro-1-methyl-2-imidazolyl-methylene)-1-indanone | 0.049 |
| 2-(5-Nitro-1-methyl-2-imidazolyl-methylene)-4-thiachromanone | 0.012 |

| | |
|---|---|
| 4'-(2-Acetoxyethoxy)-2-(5-nitro-1-methyl-2-imidazolyl-methylene)cetophenone | 0.049 |
| Metronidazole (in own test) | 1.56 |

The toxicity of the compounds of this invention is low, as evidenced by the fact they are well tolerated by mice upon an oral administration of 1 g./kg.

The compounds of Formula I are useful in the treatment of Trichomonas vaginalis infections. For such use, they can be formulated into conventional drug forms with the additives, carrier substances, and flavoring agents customary in pharmaceutical preparations which do not deleteriously react with the effective agents, employing conventional methods. For oral application, particularly suitable are tablets, dragees, capsules, pills, suspensions and solutions. Such compositions can employ, for example, water, alcohol, polyethylene glycols, gelatin, sucrose, lactose, amylose in solutions and suspensions and magnesium stearate, talc, starch, sugars, etc., in tablets. The concentration of the effective agent in the thus-formulated compositions is dependent on the activity of the specific compound employed, the responsiveness of the individual patient and the mode of administration.

Tablets usually contain, for example, 0.1 – 0.5 g. of effective agent and 0.1 – 5 g. of a pharmacologically inactive excipient.

For topical application, the compounds of this invention can be applied as a powder, solution suspension, foam or aerosol or as vaginal tablets and suppositories. For parenteral application, aqueous or oily solutions or suspensions can be used.

In the following examples, the temperatures are set forth in degrees centigrade.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

405 mg. (2.5 millimols) of 5-methoxy-1-indanone, 388 mg. (2.5 mmol) of 5-nitro-1-methyl-2-imidazolyl aldehyde, and 350 mg. of anhydrous sodium acetate were allowed to stand in 2.5 ml. of acetic anhydride for 90 minutes at 70° C. After cooling to 50°, vacuum-filtering, and washing with water, as well as digesting in boiling ethanol, 235 mg. (32 percent of theory) of 5-methoxy-2-(5-nitro-1-methyl-2-imidazolyl-methylene)-1-indanone was obtained, m.p. 256°–258°.

| | C | H | N |
|---|---|---|---|
| Calculated: | 60.19 | 4.38 | 14.04 |
| Found: | 60.44 | 4.22 | 13.94 |

EXAMPLE 2

81 mg. (0.5 mmol) of 5-methoxy-1-indanone and 78 mg. (0.5 mmol) of 5-nitro-1-methyl-2-imidazolyl aldehyde were boiled in 2 ml. of 75 percent aqueous ethanol with 0.05 ml. of concentrated hydrochloric acid for 3 hours. After cooling to 20° and working the reaction mixture up as described in Example 1, 10 mg. (6.8 percent of theory) of 5-methoxy-2-(5-nitro-1-methyl-2-imidazolylmethylene)-1-indanone was obtained.

EXAMPLE 3

81 mg. (0.5 mmol) of 5-methoxy-1-indanone and 78 mg. (0.5 mmol) of 5-nitro-1-methyl-2-imidazolyl aldehyde were boiled for 1 hour in 1 ml. of formic acid. After cooling to 20° and working up the reaction mixture as described in Example 1, 15 mg. (10 percent of theory) of 5-methoxy-2-(5-nitro-1-methyl-2-imidazolyl-methylene)-1-indanone was obtained.

EXAMPLE 4

81 mg. (0.5 mmol) of 5-methoxy-1-indanone and 78 mg. (0.5 mmol) of 5-nitro-1-methyl-2-imidazolyl aldehyde were allowed to stand for 2 days at 20° in 3.5 ml. of benzene with 11 $\mu$l. of piperidine and 9 $\mu$l. of glacial acetic acid; then, the reaction mixture was vacuum-filtered and worked up as set forth in Example 1, thus obtaining 7 mg. (5 percent of theory) of 5-methoxy-2-(5-nitro-1-methyl-2-imidazolyl-methylene)-1-indanone.

EXAMPLE 5

388 mg. (2.5 mmol) of 5-nitro-1methyl-2-imidazolyl aldehyde and 350 mg. of anhydrous sodium acetate were allowed to stand in 2.5 ml. of acetic anhydride for 90 minutes at 100°. The reaction mixture was cooled, vacuum-filtered, and washed with 5 ml. of water. After recrystallization, 125 mg. (19 percent of theory) of 5-nitro-1-methyl-2-diacetoxymethyl-imidazole was obtained, m.p. 144°–146°.

81 mg. (0.5 mmol) of 5-methoxy-1-indanone and 128 mg. (0.5 mmol) of 5-nitro-1-methyl-2-diacetoxymethyl-imidazole, as well as 70 mg. of anhydrous sodium acetate were reacted in 0.5 ml. of acetic anhydride, as described in Example 1, and worked up, thus obtaining 240 mg. (33 percent of theory) of 5-methoxy-2-(5-nitro-1-methyl-2-imidazolyl-methylene)-1-indanone.

EXAMPLE 6

330 mg. of indanone was reacted and worked up as described in Example 1, thus obtaining 322 mg. (48 percent of theory) of 2-(5-nitro-1-methyl-2-imidazolyl-methylene)-1-indanone, m.p. 250°–254°.

| | C | H | N |
|---|---|---|---|
| Calculated: | 62.44 | 4.12 | 15.60 |
| Found: | 62.27 | 4.39 | 15.80 |

EXAMPLE 7

440 mg. of 5-ethoxy-1-indanone, 388 mg. of 5-nitro-1-methyl-2-imidazolyl aldehyde, and 350 mg. of anhydrous sodium acetate were allowed to stand in 2.5 ml. of acetic anhydride for 90 minutes at a temperature of 100°. After cooling to 5°, vacuum-filtering, washing with water, and digesting with tetrahydrofuran, 182 mg. (23 percent of theory) of 5-ethoxy-2-(5-nitro-1-methyl-2-imidazolyl-methylene)-1-indanone was obtained, m.p. 261°–265°.

| | C | H | N |
|---|---|---|---|
| Calculated: | 61.33 | 4.83 | 13.41 |
| Found: | 61.76 | 4.86 | 13.54 |

EXAMPLE 8

510 mg. of 5-butoxy-2-indanone was reacted and worked up as described in Example 7, thus obtaining 259 mg. (30 percent of theory) of 5-butoxy-2-(5-nitro-1-methyl-2-imidazolyl-methylene)-1-indanone, m.p. 243°–246°.

|  | C | H | N |
|---|---|---|---|
| Calculated: | 63.32 | 5.62 | 12.31 |
| Found: | 63.87 | 5.95 | 12.69 |

EXAMPLE 9

370 mg. of 5-hydroxy-1-indanone was reacted as described in Example 7. The crude product was recrystallized from dimethylformamide, thus obtaining 324 mg. (40 percent of theory of 5-acetoxy-2-(5-nitro-1-methyl-2-imidazolyl-methylene)-1-indanone, m.p. 244°–248°.

|  | C | H | N |
|---|---|---|---|
| Calculated: | 58.71 | 4.01 | 12.84 |
| Found: | 59.02 | 4.20 | 13.04 |

EXAMPLE 10

370 mg. of 4-hydroxy-1-indanone was reacted as set forth in Example 7. The crude product was digested with methanol, thus obtaining 540 mg. (67 percent of theory) of 4-acetoxy-2-(5-nitro-1methyl-2-imidazolyl-methylene)-1-indanone, m.p. 241°–243°.

|  | C | H | N |
|---|---|---|---|
| Calculated: | 58.71 | 4.01 | 12.84 |
| Found: | 58.70 | 3.95 | 13.03 |

EXAMPLE 11

540 mg. (1.65 mmol) of 4-acetoxy-2-(5-nitro-1-methyl-2-imidazolyl-methylene)-1-indanone was boiled for 2 hours in 13.5 ml. of ethanol with 6.8 ml. of concentrated hydrochloric acid. The reaction mixture was cooled, vacuum-filtered, and recrystallized from dimethylformamide, thus obtaining 276 mg. (59 percent theory) of 4-hydroxy-2-(5-nitro-1-methyl-2-imidazolyl-methylene)-1-indanone; m.p. 285°–287°.

|  | C | H | N |
|---|---|---|---|
| Calculated: | 58.94 | 3.89 | 14.73 |
| Found: | 59.17 | 4.00 | 14.77 |

EXAMPLE 12

480 mg. of 4,5-dimethoxy-1-indanone was reacted and worked up as described in Example 7, thus obtaining 425 mg. (52 percent of theory) of 4,5-dimethoxy-2-(5-nitro-1-methyl-2-imidazolyl-methylene)-1-indanone; m.p. 228°–230°.

|  | C | H | N |
|---|---|---|---|
| Calculated: | 58.36 | 4.60 | 12.76 |
| Found: | 58.37 | 4.42 | 12.71 |

EXAMPLE 13

365 mg. of 6-methyl-1-indanone was reacted as set forth in Example 7. The crude product was recrystallized from a mixture of acetonitrile-chloroform-tetrahydrofuran, 25:30:10. 133 mg. (19 percent of theory) of 6-methyl-2-(5-nitro-1-2-imidazolyl-methylene)-1-indanone was obtained; m.p. 249°–252°.

|  | C | H | N |
|---|---|---|---|
| Calculated: | 63.59 | 4.63 | 14.83 |
| Found: | 64.13 | 4.68 | 14.90 |

EXAMPLE 14

455 mg. of 5-methoxy-6-hydroxy-1-indanone was reacted as described in Example 7. The crude product was digested with methanol and recrystallized from dimethylformamide, thus obtaining 260 mg. (30 percent of theory) of 5-methoxy-6-acetoxy-2-(5-nitro-1-methyl-2-imidazolyl-methylene)1-indanone. Melting point: 248°–252°.

|  | C | H | N |
|---|---|---|---|
| Calculated: | 57.14 | 4.24 | 11.76 |
| Found: | 57.45 | 4.17 | 11.78 |

EXAMPLE 15

590 mg. of 5-methoxy-6-acetoxy-2-(5-nitro-1-methyl-2-imidazolyl-methylene)-1-indanone was reacted and worked up as described in Example 11, thus obtaining 396 mg. (76 percent of theory) of 5-methoxy-6-hydroxy-2-(5-nitro-1-methyl-2-imidazolyl-methylene)-1-indanone, m.p. 290°.

|  | C | H | N |
|---|---|---|---|
| Calculated: | 57.14 | 4.16 | 13.33 |
| Found: | 57.76 | 4.25 | 13.46 |

EXAMPLE 16

415 mg. of 6-chloro-1-indanone was reacted as set forth in Example 7. The crude product was digested with acetonitrile, thus obtaining 431 mg. (57 percent of theory) of 6-chloro-2-(5-nitro-1-methyl-2-imidazolyl-methylene)-1-indanone; m.p. 258°–259°.

|  | C | H | N |
|---|---|---|---|
| Calculated: | 55.36 | 3.34 | 13.83 |
| Found: | 54.76 | 3.35 | 14.12 |

EXAMPLE 17

540 mg. of 5-acetoxy-2-(5-nitro-1-methyl-2-imidazolyl-methylene)-1-indanone was reacted and worked up as described in Example 11, thus obtaining 420 mg. (90 percent of theory) of 5-hydroxy-2-(5-nitro-1-methyl-2-imidazolyl-methylene)-1-indanone; m.p. 292°.

|  | C | H |
|---|---|---|
| Calculated | 58.94 | 3.89 |
| Found: | 58.38 | 4.19 |

EXAMPLE 18

370 mg. of 7-hydroxy-1-indanone was reacted as set forth in Example 7. The crude product was recrystallized from a mixture of acetonitrile-chloroform, 1:1, thus obtaining 180 mg. (22 percent of theory) of 7-acetoxy-2-(5-nitro-1-methyl-2-imidazolyl-methylene)-1-indanone; m.p. 225°–229°.

|  | C | H |
|---|---|---|
| Calculated: | 58.94 | 3.89 |
| Found: | 58.38 | 4.19 |

EXAMPLE 19

485 mg. of 7-acetoxy-1-indanone was reacted as described in Example 7. The crude product was digested with methanol, thus obtaining 80 mg. (10 percent of theory) of 7-acetoxy-2-(5-nitro-1-methyl-2-imidazolyl-methylene)-1-indanone.

EXAMPLE 20

550 mg. of 5-(2-ethoxyethoxy)-1-indanone was reacted and worked up as described in Example 7, thus obtaining 100 mg. (11 percent of theory) of 5-(2-ethoxyethoxy)-2-(5-nitro-1-methyl-2-imidazolyl-methylene)-1-indanone, m.p. 220°–222°.

|  | C | H | N |
|---|---|---|---|
| Calculated | 60.49 | 5.36 | 11.76 |
| Found: | 59.91 | 5.50 | 11.56 |

EXAMPLE 21

365 mg. of 3-methyl-1-indanone was reacted and worked up as set forth in Example 7, thus obtaining 100 mg. (14 percent of theory) of 3-methyl-2-(5-nitro-1-methyl-2-imidazolyl-methylene)-1-indanone, m.p. 215°–216°.

|  | C | H | N |
|---|---|---|---|
| Calculated: | 63.62 | 4.63 | 14.83 |
| Found: | 63.83 | 4.62 | 14.94 |

EXAMPLE 22

375 mg. of 6-hydroxy-3-benzofuranone was reacted as described in Example 1. The crude product was recrystallized first from a mixture of methanol-chloroform, 1:1, and then from dimethylformamide. 270 mg. (33 percent of theory) of 6-acetoxy-2-(5-nitro-1-methyl-2-imidazolyl-methylene)-3-benzofuranone is obtained, m.p. 258°–259°.

|  | C | H | N |
|---|---|---|---|
| Calculated: | 54.71 | 3.37 | 12.76 |
| Found: | 54.22 | 3.40 | 12.78 |

EXAMPLE 23

542 mg. of 6-acetoxy-2-(5-nitro-1-methyl-2-imidazolyl-methylene)-3-benzofuranone was reacted and worked up as set forth in Example 11, thus obtaining 207 mg. (44 percent of theory) of 6-hydroxy-2-(5-nitro-1-methyl-2-imidazolyl-methylene)-3-benzofuranone, m.p. > 290°.

|  | C | H | N |
|---|---|---|---|
| Calculated: | 54.36 | 3.16 | 14.63 |
| Found: | 53.86 | 3.38 | 14.70 |

EXAMPLE 24

350 mg. of thioindoxyl was reacted as described in Example 7. The crude product was digested with dimethylformamide, thus obtaining 132 mg. (18 percent of theory) of 2-(5-nitro-1-methyl-2-imidazolyl-methylene)-thioindoxyl; m.p. 283°–288°.

|  | C | H | N | S |
|---|---|---|---|---|
| Calculated: | 54.36 | 3.16 | 14.62 | 11.16 |
| Found: | 54.56 | 3.47 | 14.30 | 11.50 |

EXAMPLE 25

541 mg. of 7-acetoxy-2-(5-nitro-1-methyl-2-imidazolyl-methylene)-1-indanone was reacted as set forth in Example 11. The crude product was digested with ethanol, thus obtaining 271 mg. (97 percent of theory) of 7-hydroxy-2-(5-nitro-1-methyl-2-imidazolyl-methylene)-1-indanone; m.p. 265°–268°.

|  | C | H | N |
|---|---|---|---|
| Calculated: | 58.94 | 3.89 | 14.73 |
| Found: | 59.32 | 3.85 | 14.69 |

EXAMPLE 26

365 mg. of 4-methyl-1-indanone was reacted as described in Example 7. After digesting in hot dimethylformamide, 213 mg. (30 percent of theory) of 4-methyl-2-(5-nitro-1-methyl-2-imidazolyl-methylene)-1-indanone was obtained; m.p. 245°–255°.

|  | C | H | N |
|---|---|---|---|
| Calculated: | 63.59 | 4.63 | 14.83 |
| Found: | 63.73 | 4.80 | 14.58 |

EXAMPLE 27

435 mg. of 6-isopropyl-1-indanone was reacted and worked up as described in Example 26, thus obtaining 242 mg. of 6-isopropyl-2-(5-nitro-1-methyl-2-imidazolyl-methylene)-1-indanone (31 percent of theory); m.p. 243/50°–255°.

|  | C | H | N |
|---|---|---|---|
| Calculated: | 65.59 | 5.51 | 13.50 |
| Found: | 65.50 | 5.67 | 13.46 |

EXAMPLE 28

407 mg. of 4-methoxy-1-indanone was reacted and worked up as described in Example 26, thus obtaining 209 mg. (28 percent of theory) of 4-methoxy-2-(5-nitro-1-methyl-2-imidazolyl-methylene)-1-indanone; m.p. 259°–264°.

|  | C | H | N |
|---|---|---|---|
| Calculated: | 60.19 | 4.38 | 14.04 |
| Found: | 60.00 | 4.50 | 13.93 |

EXAMPLE 29

470 mg. of 5-allyloxy-1-indanone was reacted and worked up as described in Example 26, thus obtaining 176 mg. (22 percent of theory) of 5-allyloxy-2-(5-nitro-1-methyl-2-imidazolyl-methylene)-1-indanone, m.p. 256°–260°.

|  | C | H | N |
|---|---|---|---|
| Calculated: | 62.76 | 4.65 | 12.92 |
| Found: | 62.89 | 4.61 | 12.95 |

EXAMPLE 30

594 mg. of 5-benzoxy-1-indanone was reacted and worked up as set forth in Example 26, thus obtaining 159 mg. (17 percent of theory) of 5-benzoxy-2-(5-nitro-1-methyl-2-imidazolyl-methylene)-1-indanone; m.p. 256°–260°.

|             | C     | H    | N     |
|-------------|-------|------|-------|
| Calculated: | 67.20 | 4.57 | 11.21 |
| Found:      | 67.25 | 4.86 | 11.20 |

EXAMPLE 31

415 mg. of 4-chloro-1-indanone was reacted and worked up as described in Example 26, thus producing 166 mg. (22 percent of theory) of 4-chloro-2-(5-nitro-1-methyl-2-imidazolyl-methylene)-1-indanone, m.p. 239/44°–B249°.

|             | C     | H    | N     |
|-------------|-------|------|-------|
| Calculated: | 55.36 | 3.34 | 13.83 |
| Found:      | 55.29 | 3.24 | 13.84 |

EXAMPLE 32

480 mg. of 5,6-dimethoxy-1-indanone was reacted and worked up as set forth in Example 26, thus obtaining 180 mg. (22 percent of theory) of 5,6-dimethoxy-2-(5-nitro-1-methyl-2-imidazolyl-methylene)-1-indanone; m.p. 258°–266°.

|             | C     | H    | N     |
|-------------|-------|------|-------|
| Calculated: | 58.36 | 4.60 | 12.76 |
| Found:      | 58.10 | 4.70 | 13.00 |

EXAMPLE 33

455 mg. of 5-hydroxy-6-methoxy-1-indanone was reacted and worked up as described in Example 26, thus obtaining 118 mg. (13 percent of theory) of 6-methoxy-5-acetoxy-2-(5-nitro-1-methyl-2-imidazolyl-methylene)-1-indanone; m.p. 258°–259°.

|             | C     | H    | N     |
|-------------|-------|------|-------|
| Calculated: | 57.14 | 4.24 | 11.76 |
| Found:      | 57.00 | 4.64 | 11.78 |

EXAMPLE 34

590 mg. of 6-methoxy-5-acetoxy-2-(5-nitro-1-methyl-2-imidazolyl-methylene)-1-indanone was reacted as set forth in Example 11. After vacuum-filtering, 475 mg. (91 percent of theory) of 5-hydroxy-6-methoxy-2-(5-nitro-1-methyl-2-imidazolyl-methylene)-1-indanone was obtained, m.p. > 290°.

|             | C     | H    | N     |
|-------------|-------|------|-------|
| Calculated: | 63.59 | 4.63 | 14.83 |
| Found:      | 63.73 | 4.80 | 14.58 |

EXAMPLE 35

455 mg. of 4-chloro-7-hydroxy-1-indanone was reacted and worked up as set forth in Example 26, thus producing 292 mg. (32 percent of theory) of 4-chloro-7-acetoxy-2-(5-nitro-1-methyl-2-imidazolyl-methylene)-1-indanone, m.p. 241°–242°.

|             | C     | H    | N     |
|-------------|-------|------|-------|
| Calculated: | 53.12 | 3.35 | 11.62 |
| Found:      | 52.64 | 3.36 | 11.78 |

EXAMPLE 36

600 mg. of 4-chloro-7-acetoxy-2-(5-nitro-1-methyl-2-imidazolyl-methylene)-1-indanone was reacted as described in Example 11. After vacuum-filtering, 530 mg. (99 percent of theory) of 4-chloro-7-hydroxy-2-(5-nitro-1-methyl-2-imidazolyl-methylene)-1-indanone was obtained, m.p. 266°–267°.

|             | C     | H    | N     |
|-------------|-------|------|-------|
| Calculated: | 52.59 | 3.16 | 13.14 |
| Found:      | 52.80 | 3.17 | 13.20 |

EXAMPLE 37

518 mg. of 3-phenyl-1-indanone, 388 mg. of 5-nitro-1-methyl-2-imidazolyl aldehyde, and 350 mg. of anhydrous sodium acetate were allowed to stand for eight hours at a temperature of 100° in 250 ml. of acetic anhydride. After cooling to 5°, vacuum-filtering, washing with water, and recrystallization from dimethylformamide, 222 mg. (26 percent of theory) of 3-phenyl-2-(5-nitro-1-methyl-2-imidazolyl-methylene)-1-indanone was obtained, m.p. 184°–186°.

|             | C     | H    | N     |
|-------------|-------|------|-------|
| Calculated: | 69.75 | 4.10 | 12.21 |
| Found:      | 69.00 | 4.74 | 12.01 |

EXAMPLE 38

485 mg. of 6,7-dimethoxy-3-benzofuranone was reacted and worked up as described in Example 26, thus producing 231 mg. (28 percent of theory) of 6,7-dimethoxy-2-(5-nitro-1-methyl-2-imidazolyl-methylene)-3-benzofuranone, m.p. 253/8°–261°.

|             | C     | H    | N     |
|-------------|-------|------|-------|
| Calculated: | 54.38 | 3.96 | 12.69 |
| Found:      | 54.16 | 4.00 | 12.50 |

EXAMPLE 39

370 mg. of 4-chromanone was reacted as set forth in Example 7. After digesting in hot dimethylformamide and recrystallizing from tetrahydrofuran, 10 mg. (1.4 percent of theory) of 3-(5-nitro-1-methyl-2-imidazolyl-methylene)-4-chromanone was obtained, m.p. 215°–218°.

|             | C     | H    | N     |
|-------------|-------|------|-------|
| Calculated: | 58.94 | 3.89 | 14.73 |
| Found:      | 58.70 | 4.00 | 14.48 |

EXAMPLE 40

410 mg. of 7-hydroxy-4-chromanone was reacted as described in Example 7. After the addition of 5 ml. of water, the reaction mixture was cooled to 5°, the precipitated product was vacuum-filtered and recrystallized from dimethylformamide/water. 78 mg. (9.2 percent of theory) of 7-acetoxy-3-(5-nitro-1-methyl-2-imidazolyl-methylene)-4-chromanone was obtained, m.p. 202°–203°.

|             | C     | H    | N     |
|-------------|-------|------|-------|
| Calculated: | 55.65 | 4.38 | 12.17 |
| Found:      | 56.75 | 3.89 | 12.31 |

EXAMPLE 41

388 mg. (2.5 mmol) of 5-nitro-1-methyl-2-imidazolyl aldehyde and 440 mg. (2.5 mmol) of 6-methoxy-1-tetralone were heated in 2.55 ml. of glacial acetic acid and 0.055 ml. of 95 percent sulfuric acid for 6 hours to 100°. After cooling, the reaction liquor was mixed with methanol and vacuum-filtered, thus obtaining 154 mg. (20 percent of theory) of 6-methoxy-2-(5-nitro-1-methyl-2-imidazolyl-methylene)-1-tetralone, m.p. 215°.

|  | C | H | N |
|---|---|---|---|
| Calculated: | 61.33 | 4.83 | 13.41 |
| Found: | 61.45 | 5.20 | 13.27 |

EXAMPLE 42

415 mg. of 5-chloro-1-indanone was reacted and worked up as described in Example 26, thus producing 20 mg. (2 percent of theory) of 5-chloro-2-(5-nitro-1-methyl-2-imidazolyl-methylene)-1-indanone, m.p. 266/74°–B276°.

|  | C | H | N |
|---|---|---|---|
| Calculated: | 55.36 | 3.34 | 13.83 |
| Found: | 55.44 | 3.31 | 13.75 |

EXAMPLE 43

570 mg. (2 mmol) of 5-hydroxy-2-(5-nitro-1-methyl-2-imidazolyl-methylene)-1-indanone was agitated for 1 hour at 20° with 660 mg. (4 mmol) of cinnamic acid chloride in 8 ml. of pyridine. After dilution with 5 ml. of ethanol, vacuum-filtering of the precipitate, and recrystallization from dimethylformamide, 632 mg. (76 percent of theory) of 5-cinnamoyloxy-2-(5-nitro-1-methyl-2-imidazolyl-methylene)-1-indanone was obtained; m.p. 252°–254°.

|  | C | H | N |
|---|---|---|---|
| Calculated: | 66.50 | 4.13 | 10.12 |
| Found: | 66.20 | 4.46 | 10.20 |

EXAMPLE 44

485 mg. (2.5 mmol) of 7-methoxy-4-thiachromanone was reacted and worked up as described in Example 41, thus obtaining 70 mg. (8.5 percent of theory) of 7-methoxy-2-(5-nitro-1-methyl-2-imidazolyl-methylene)-4-thiachromanone; m.p. 192/193°–BR198°.

|  | N | S |
|---|---|---|
| Calculated: | 12.69 | 9.68 |
| Found: | 12.56 | 9.34 |

EXAMPLE 45

508 mg. (2.5 mmol) of 6-acetylamino-1-tetralone was reacted as described in Example 41, except that the heating step lasted only 5 hours, and then worked up as set forth in that example. 253 mg. (30 percent of theory) of 6-acetylamino-2-(5-nitro-1-methyl-2-imidazolyl-methylene)-1-tetralone was obtained, m.p. 227°–228°°C.

|  | C | H | N |
|---|---|---|---|
| Calculated: | 60.00 | 4.74 | 16.46 |
| Found: | 59.91 | 4.96 | 16.00 |

EXAMPLE 46

600 mg. (2.5 mmol) of 6-methanesulfonyloxy-1-tetralone was reacted as set forth in Example 41, but heated for 7 hours, and then worked up as described therein, thus obtaining 250 mg. (27 percent of theory) of 6-methanesulfonyloxy-2-(5-nitro-1-methyl-2-imidazolyl-methylene)-1-tetralone, m.p. 183°–185°.

|  | N | S |
|---|---|---|
| Calculated: | 11.14 | 8.50 |
| Found: | 11.18 | 8.78 |

EXAMPLE 47

405 mg. (2.5 mmol) of 6-hydroxy-1-tetralone was reacted as described in Example 41, but heated only for 3 hours, and then worked up as described therein. 105 mg. (14 percent of theory) of 6-hydroxy-2-(5-nitro-1-methyl-2-imidazolyl-methylene)-1-tetralone was produced, m.p. 238°–240°.

|  | C | H | N |
|---|---|---|---|
| Calculated: | 60.19 | 4.38 | 14.04 |
| Found: | 60.19 | 4.75 | 13.76 |

EXAMPLE 48

365 mg. (2.5 mmol) of 1-tetralone was reacted as set forth in Example 41, but heated only for 2½ hours, and then worked up as set forth in that example, thus obtaining 30 mg. (4.2 percent of theory) of 2-(5-nitro-1-methyl-2-imidazolyl-methylene)-1-tetralone, m.p. 193°–195°.

|  | C | H | N |
|---|---|---|---|
| Calculated: | 63.59 | 4.63 | 14.83 |
| Found: | 64.01 | 4.97 | 14.48 |

EXAMPLE 49

11 g. (78 mmol) of 5-nitro-1-ethyl-imidazole was heated with 11.7 g. of paraformaldehyde in 57 ml. of dimethyl sulfoxide in a sealed tube for 48 hours to 110°. After the volatile components had been distilled off at 1 mm. Hg and a bath temperature of 100°, the residue was recrystallized twice from benzene, thus producing 5.1 g. (38 percent of theory) of 5-nitro-1-ethyl-2-hydroxymethyl-imidazole; m.p. 101°–102°.

3.42 g. (20 mmol) of this compound was boiled in 113 ml. of benzene with 15 g. of lead tetraacetate for 8 hours. After cooling, filtering, washing the benzenic solution neutral, and drying the same, the product was evaporated under a vacuum, thus obtaining 2.37 g. (70 percent of theory) of 5-nitro-1-ethyl-2-imidazolyl aldehyde in the form of an oil.

424 mg. (2.5 mmol) of this compound was reacted with 370 mg. (2.5 mmol) of 5-hydroxy-1-indanone, as set forth in Example 7. The crude product was digested with hot ethanol, thus producing 145 mg. (17 percent of theory) of 5-acetoxy-2-(5-nitro-1-ethyl-2-imidazolyl-methylene)-1-indanone, m.p. 225°–227°.

|  | C | H | N |
|---|---|---|---|
| Calculated: | 59.82 | 4.43 | 12.32 |
| Found: | 59.50 | 4.30 | 12.38 |

EXAMPLE 50

3.66 g. (20 mmol) of 5-nitro-1-allyl-2-hydroxymethylimidazole was treated with lead tetraacetate and worked up as described in Example 49, thus obtaining 2.7 g. (74 percent of theory) of 5-nitro-1-allyl-2-imidazolyl aldehyde in the form of an oil.

443 mg. (2.5 mmol) of this compound was reacted with 370 mg. (2.5 mmol) of 5-hydroxy-1-indanone as set forth in Example 7. The crude product was recrystallized from ethanol, thus producing 18 mg. (2 percent of theory) of 5-acetoxy-2-(5-nitro-1allyl-2-imidazolyl-methylene)-1-indanone, m.p. 188°–191°.

|  | C | H | N |
|---|---|---|---|
| Calculated: | 61.19 | 4.28 | 11.89 |
| Found: | 61.62 | 4.00 | 12.23 |

EXAMPLE 51

300 mg. (2.5 mmol) of acetophenone was reacted and worked up as described in Example 41; yield: 335 mg. (52 percent of theory) of 2-(5-nitro-1-methyl-2-imidazolyl-methylene)-acetophenone, m.p. 202°.

|  | C | H | N |
|---|---|---|---|
| Calculated: | 60.70 | 4.31 | 16.34 |
| Found: | 60.47 | 4.27 | 16.33 |

EXAMPLE 52

340 mg. (2.5 mmol) of 4'-hydroxyacetophenone was reacted and worked up as set forth in Example 41. Yield: 270 mg. (40 percent of theory) of 4'-hydroxy-2-(5-nitro-1-methyl-2-imidazolylmethylene)-acetophenone, m.p. > 290°.

|  | C | H | N |
|---|---|---|---|
| Calculated: | 57.15 | 4.06 | 15.38 |
| Found: | 56.76 | 4.26 | 15.61 |

EXAMPLE 53

450 mg. (2.5 mol) of 4'-(2-hydroxyethoxy)-acetophenone was reacted and worked up as described in Example 41. Yield: 406 mg. (45 percent of theory) of 4'-(2-acetoxyethoxy)-2-(5-nitro-1-methyl-2-imidazolyl-methylene)-acetophenone, m.p. 163°.

|  | C | H | N |
|---|---|---|---|
| Calculated: | 56.82 | 4.77 | 11.70 |
| Found: | 57.10 | 5.18 | 11.68 |

EXAMPLE 54

405 mg. of 7-methoxy-1-indanone was reacted and worked up as set forth in Example 10. Yield: 191 mg. (26 percent of theory) of 7-methoxy-2-(5-nitro-1-methyl-2-imidazolyl-methylene)-1-indanone; m.p. 273°–282°.

|  | C | H | N |
|---|---|---|---|
| Calculated: | 60.19 | 4.38 | 14.04 |
| Found: | 59.63 | 4.57 | 13.81 |

EXAMPLE 55

570 mg. of 5-hydroxy-2-(5-nitro-1-methyl-2-imidazolylmethylene)-1-indanone was mixed in 10 ml. of pyridine with 764 mg. of p-toluenesulfonyl chloride. After allowing the reaction mixture to stand for 1 hour at 20° and for 1 hour at 100°, it was mixed with ethanol, cooled, and vacuum-filtered, thus obtaining 707 mg. (64 percent of theory) of 5-p-toluenesulfonyloxy-2-(5-nitro-1-methyl-2-imidazolyl-methylene)-1-indanone, m.p. 221.5°–224°.

|  | N | S |
|---|---|---|
| Calculated: | 9.56 | 7.30 |
| Found: | 9.88 | 7.10 |

EXAMPLE 56

4.8 g. of 5-nitro-1-(2-benzoyloxyethyl)-imidazole was heated with 2.76 g. of paraformaldehyde in 16.8 ml. of dimethyl sulfoxide in a sealed tube at 110° for 48 hours. Evaporation under vacuum and recrystallization from benzene yielded 2.77 g. (52 percent of theory) of 5-nitro-2-hydroxymethyl-1-(2-benzoyloxyethyl)-imidazole, m.p. 136°–139°.

5.84 g. of this compound was treated with lead tetraacetate and worked up, as described in Example 49. Yield: 3.95 g. (68 percent of theory) of 5-nitro-1-(2-benzoyloxyethyl)-2-imidazolyl aldehyde, m.p. 113°–114°.

772 mg. of this compound was reacted with 370 mg. of 5-hydroxy-1-indanone as described in Example 10 (except that the heating step was conducted for 4 hours), and worked up. Yield: 306 mg. (27 percent of theory) of 5-acetoxy-2-[5-nitro-1-(2-benzoyloxyethyl)-2-imidazolyl-methylene]-1-indanone; m.p. 186.5°–187.5°.

|  | C | H | N |
|---|---|---|---|
| Calculated: | 62.47 | 4.15 | 9.12 |
| Found: | 62.75 | 4.11 | 9.34 |

EXAMPLE 57

410 mg. of 4-thiachromanone was reacted and worked up as set forth in Example 41, thus obtaining 122 mg. (12 percent of theory) of 3-(5-nitro-1-methyl-2-imidazolyl-methylene)-4-thiachromanone · 1 H₂SO₄, m.p. 189/190°–193°.

|  | C | H | N | S |
|---|---|---|---|---|
| Calculated: | 42.10 | 3.28 | 10.53 | 16.04 |
| Found: | 42.54 | 3.53 | 10.42 | 15.69 |

H₂SO₄-Free Compound:
Melting point: 176°–178°.

|  | N | S |
|---|---|---|
| Calculated: | 13.95 | 10.64 |
| Found: | 13.47 | 10.44 |

EXAMPLE 58

555 mg. of 5-hydroxy-6,7-dimethoxy-1-tetralone was reacted and worked up as described in Example 41, thus obtaining 116 mg. (13 percent of theory) of 5-hydroxy-6,7-dimethoxy-2-(5-nitro-1-methyl-2-imidazolyl-methylene)-1-tetralone; m.p. 246°–248°.

|             | C     | H    | N     |
|-------------|-------|------|-------|
| Calculated: | 56.82 | 4.77 | 11.70 |
| Found:      | 56.79 | 4.99 | 11.36 |

EXAMPLE 59

570 mg. of 7-chloro-4,6-dimethoxy-3-benzofuranone was reacted as described in Example 10 (except that the heating step is conducted at 100° for 2½ hours), and worked up. Yield: 353 mg. (39 percent of theory) of 7-chloro-4,6-dimethoxy-2-(5-nitro-1-methyl-2-imidazolyl-methylene)-3-benzofuranone; m.p. > 295°.

|             | N     | Cl   |
|-------------|-------|------|
| Calculated: | 11.49 | 9.70 |
| Found:      | 11.32 | 9.63 |

EXAMPLE 60

473 mg. of 5-acetylamino-1-indanone was reacted and worked up as set forth in Example 57, thus obtaining 193 mg. (24 percent of theory) of 5-acetylamino-2-(5-nitro-1-methyl-2-imidazolylmethylene)-1-indanone, m.p. 275°–285°.

|             | C     | H    | N     |
|-------------|-------|------|-------|
| Calculated: | 58.89 | 4.33 | 17.17 |
| Found:      | 58.66 | 4.63 | 17.28 |

EXAMPLE 61

340 mg. (1 mmol) of 6-acetylamino-2-(5-nitro-1-methyl-2-imidazolyl-methylene)-1tetralone was boiled in 8 ml. of ethanol and 4 ml. of concentrated hydrochloric acid for 2 hours. After cooling and vacuum-filtering, 169 mg. (56 percent of theory) of 6-amino-2-(5-nitro-1-methyl-2-imidazolyl-methylene)-1-tetralone; m.p. > 295°.

|             | C     | H    | N     |
|-------------|-------|------|-------|
| Calculated: | 60.39 | 4.74 | 18.78 |
| Found:      | 60.20 | 5.06 | 19.22 |

EXAMPLE 62

403 mg. of 6-amino-1-tetralone was reacted and worked up as described in Example 41. Yield: 115 mg. (15 percent of theory) of 6-amino-2-(5-nitro-1-methyl-2-imidazolyl-methylene)-1-tetralone, m.p. > 295°.

EXAMPLE 63

435 mg. of 5,7-dimethyl-1-tetralone was reacted and worked up as set forth in Example 41, thus obtaining 179 mg. (23 percent of theory) of 5,7-dimethyl-2-(5-nitro-1-methyl-2-imidazolylmethylene)-1-tetralone, m.p. 228°–229°.

|             | C     | H    | N     |
|-------------|-------|------|-------|
| Calculated: | 65.59 | 5.51 | 13.50 |
| Found:      | 65.51 | 5.73 | 13.46 |

EXAMPLE 64

568 mg. of 4-bromo-7-hydroxy-1-indanone was reacted as described in Example 57. The product was digested with water and recrystallized from acetonitrile. Yield: 318 mg. (32 percent of theory) of 4-bromo-7-acetoxy-2-(5-nitro-1-methyl-2-imidazolyl-methylene)-1-indanone; m.p. 248°–251°.

|             | N     | Br    |
|-------------|-------|-------|
| Calculated: | 10.35 | 19.67 |
| Found:      | 10.32 | 19.96 |

EXAMPLE 65

690 mg. of sodium, 4.44 g. of 5-hydroxy-1-indanone, and 7.5 g. of 2-bromoethanol were boiled for 48 hours with a spatula tip amount of potassium iodide in 40 ml. of alcohol. After the solvent had been removed by evaporation under vacuum, the residue was shaken with 50 ml. of water and 50 ml. of ethyl acetate. The thus-produced precipitate was vacuum-filtered and recrystallized from ethyl acetate, thus obtaining 900 mg. (16 percent of theory) of 5-(2-hydroxyethoxy-1-indanone, m.p. 121/122°–127°.

480 mg. of 5-(2-hydroxyethoxy)-1-indanone was reacted and worked up as described in Example 57. Yield: 145 mg. (16 percent of theory) of 5-(2-acetoxyethoxy)-2-(5-nitro-1-methyl-2-imidazolyl-methylene)-1-indanone, m.p. 212/215°–216°.

|             | C     | H    | N     |
|-------------|-------|------|-------|
| Calculated: | 58.22 | 4.62 | 11.32 |
| Found:      | 57.33 | 4.65 | 11.77 |

EXAMPLE 66

490 mg. of 5-chloro-4,6-dimethyl-3-benzofuranone was reacted as set forth in Example 57. By recrystallizing the product from tetrahydrofuran, after digesting the product with water, 65 mg. (8 percent of theory) of 5-chloro-4,6-dimethyl-2-(5-nitro-1-methyl-2-imidazolyl-methylene)-3-benzofuranone was obtained; m.p. 265°–271°.

|             | N     | Cl    |
|-------------|-------|-------|
| Calculated: | 12.59 | 10.63 |
| Found:      | 12.14 | 10.61 |

EXAMPLE 67

4.0 g. of 5-nitro-1-butyl-2-hydroxymethyl-imidazole was treated with lead tetraacetate and worked up, as described in Example 49, thus obtaining 3.03 g. (76 percent of theory) of 5-nitro-1-butyl-2-imidazolyl aldehyde in the form of an oil.

497 mg. of this compound was reacted with 370 mg. of 5-hydroxy-1-indanone as set forth in Example 7. The product was digested with water and recrystallized from ethanol/butanol, thus producing 130 mg. (14 percent of theory) of 5-acetoxy-2-(5-nitro-1-butyl-2-imidazolyl-methylene)-1-indanone; m.p. 185°–187°.

|             | C     | H    | N     |
|-------------|-------|------|-------|
| Calculated: | 61.74 | 5.18 | 11.38 |
| Found:      | 61.80 | 5.46 | 10.81 |

EXAMPLE 68

455 mg. of thioindoxyl-1,1-dioxide was reacted as set forth in Example 7. After cooling the reaction mixture, filtering same off from sodium acetate, and mixing the filtrate with water, a precipitate was obtained which was recrystallized from acetonitrile. 33 mg. (4 percent of theory) of 2-(5-nitro-1-methyl-2-imidazolyl-methylene)-thioindoxyl-1,1-dioxide was obtained, m.p. 288°.

|  | N | S |
|---|---|---|
| Calculated: | 13.15 | 10.04 |
| Found: | 12.83 | 9.75 |

EXAMPLE 69

574 mg. (2 mmol) of 2-(5-nitro-1-methyl-2-imidazolyl-methylene)-thioindoxyl was mixed in 50 ml. of glacial acetic acid with 0.5 ml. of 30 percent hydrogen peroxide (in 10 ml. of glacial acetic acid). After agitating the reaction mixture for 16 hours at 20°, another 0.5 ml. of 30 percent hydrogen peroxide was added thereto. After agitating for 8 hours at 20°, the reaction mixture was filtered; the filtrate was evaporated under vacuum, and the residue digested with methanol, thus obtaining 108 mg. (18 percent of theory) of 2-(5-nitro-1-methyl-2-imidazolyl-methylene)-thioindoxyl-1-oxide; m.p. 256°.

|  | N | S |
|---|---|---|
| Calculated: | 13.85 | 10.56 |
| Found: | 14.06 | 10.69 |

EXAMPLE 70

638 mg. of 5-(2-dimethylaminoethoxy)-1-indanone, hydrochloride, was reacted as described in Example 7. After mixing the reaction mixture with water, it was extracted with chloroform. The evaporated chloroform extract was taken up in methanol and mixed with ether. After filtering, the filtrate was evaporated to dryness, and the residue was dissolved in 25 ml. of 2N hydrochloric acid. After the hydrochloric phase had been washed with ether and ethyl acetate, it was made alkaline with 2N sodium hydroxide solution, and extracted with chloroform. The residue of the evaporated chloroform extract was diluted with methanol and ether; by vacuum-filtering, 4.7 mg. (0.5 percent of theory) of 5-(2-dimethylaminoethoxy)-2-(5-nitro-1-methyl-2-imidazolyl-methylene)-1-indanone was obtained, m.p. 223°–225°.

The structure was confirmed by the mass spectrum, exhibiting intensive peaks at 356 (M) and 58 [$CH_2 = N^{(+)}(CH_3)_2$].

EXAMPLE 71

662 mg. of 5-methoxy-2-(5-nitro-1-methyl-2-imidazolylmethylene)-4-thiachromanone was mixed in 50 ml. of glacial acetic acid with 0.5 ml. of 30 percent hydrogen peroxide. After agitation of the reaction mixture for 24 hours at 20°, 0.5 ml. of 30 percent hydrogen peroxide was added thereto, and after another 24 hours at 20°, a further 0.5 ml. of hydrogen peroxide was introduced. After 72 hours at 20°, the reaction mixture was filtered, and the precipitate was recrystallized from acetonitrile. Yield: 259 mg. (30 percent of theory) of 5-methoxy-2-(5-nitro-1-methyl-2-imidazolyl-methylene)-4-thiachromanone-1-oxide; m.p. 241/42°–245°.

|  | N | S |
|---|---|---|
| Calculated: | 12.10 | 9.23 |
| Found: | 12.05 | 9.33 |

EXAMPLE 72

5.95 g. (36.8 mmol) of 6-amino-1-tetralone in 200 ml. of water was mixed dropwise, at 80°, simultaneously with 12 ml. of dimethyl sulfate and 6.75 ml. of 50 percent sodium hydroxide solution. After cooling, the reaction mixture was vacuum-filtered and the precipitate triturated with ether. The ether filtrate resulted, after evaporation, in 3 g. of substance which was chromatographed over a silica gel column (150 g.) with petroleum ether/ethyl acetate. First, 473 mg. of 6-dimethylamino-1-tetralone was obtained, m.p. 66°–67°, and then 1.21 g. of 6-methylamino-1-tetralone was produced, m.p. 93°–94°.

473 mg. of 6-dimethylamino-1-tetralone was reacted as described in Example 41, thus obtaining 207 mg. (25 percent of theory) of 6-dimethylamino-2-(5-nitro-1-methyl-2-imidazolylmethylene)-1-tetralone, m.p. 239/46°–B49°.

|  | C | H | N |
|---|---|---|---|
| Calculated: | 62.57 | 5.57 | 17.17 |
| Found: | 62.50 | 5.73 | 16.98 |

EXAMPLE 73

46 mg. of sodium was dissolved in 10 ml. of alcohol, and 220 mg. (2 mmol) of 1-methyl-2-imidazolyl aldehyde, as well as 324 mg. (2 mmol) of 5-methoxy-1-indanone were added thereto. After agitating for one-half hour under a nitrogen atmosphere, the solution was poured into 20 ml. of water, and the crystals were vacuum-filtered. Yield: 258 mg. (50 percent of theory) of 5-methoxy-2-(1-methyl-2-imidazolyl-methylene)-1-indanone, m.p. 258°–259°. 300 mg. of this compound was mixed in 1.6 ml. of nitric acid (sp. gr. 1.4) at 4° with 1.6 ml. of concentrated sulfuric acid. The reaction mixture was boiled for 2 hours under reflux, cooled to 20°, and poured into ice water. Vacuum-filtering resulted in a mixture of substances, from which 40 mg. of 5-methoxy-2-(5-nitro-1-methyl-2-imidazolyl-methylene)-1-indanone (11 percent of theory), m.p. 256°–259°, was obtained by preparative thin-layer chromatography.

EXAMPLE 74

370 mg. (2.5 mmol) of 5-hydroxy-1-indanone was treated and worked up as described in Example 41. Yield: 450 mg. of 5-hydroxy-2-(5-nitro-1-methyl-2-imidazolyl-methylene)-1-indanone (63 percent of theory), m.p. 292°.

EXAMPLE 75

5.4 g. (14.5 mmol) of 5-(2-acetoxyethoxy)-2-(5-nitro-1-methyl-2-imidazolyl-methylene)-1-indanone was boiled for 2 hours in 120 ml. of ethanol and 59 ml. of concentrated hydrochloric acid. After cooling the reaction mixture, it was vacuum-filtered. Yield: 3.1 g. (65 percent of theory) of 5-(2-hydroxyethoxy)-2-(5-nitro-1-methyl-2-imidazolyl-methylene)-1-indanone, m.p. 258°.

|  | C | H | N |
|---|---|---|---|
| Calculated: | 58.36 | 4.60 | 12.76 |
| Found: | 58.05 | 4.85 | 12.29 |

EXAMPLE 76

625 mg. (1.92 mmol) of 5-acetylamino-2-(5-nitro-1-methyl-2-imidazolyl-methylene)-1-indanone was boiled for 2 hours in 15.3 ml. of ethanol and 7.7 ml. of concentrated hydrochloric acid. Cooling, vacuum-filtering, and digesting in hot water and then in hot ethanol resulted in 454 mg. (83 percent of theory) of 5-amino-2-(5-nitro-1-methyl-2-imidazolyl-methylene)-1-indanone, m.p. 292°.

|  | C | H | N |
|---|---|---|---|
| Calculated: | 59.14 | 4.26 | 19.71 |
| Found: | 59.14 | 4.38 | 19.47 |

EXAMPLE 77

300 mg. (2.5 mmol) of acetophenone was reacted as set forth in Example 7. After cooling, the reaction mixture was filtered to remove sodium acetate and the filtrate mixed with 5 ml. of water. Vacuum-filtering resulted in 53 mg. (8 percent of theory) of 2-(5-nitro-1-methyl-2-imidazolyl-methylene)-acetophenone, m.p. 202°.

EXAMPLE 78

415 mg. (2.5 mmol) of 5,6-dihydroxy-1-indanone was treated and worked up as described in Example 41. Recrystallization from dimethylformamide-methanol resulted in 250 mg. (33 percent of theory) of 5,6-dihydroxy-2-(5-nitro-1-methyl-2-imidazolyl-methylene)-1-indanone, m.p.: above 290°.

|  | C | H | N |
|---|---|---|---|
| Calculated: | 55.81 | 3.68 | 13.95 |
| Found: | 55.38 | 4.05 | 13.77 |

EXAMPLE 79

520 mg. (2.5 mmol) of 4-fluoro-7-chloro-3-methyl-1-indanone was treated as set forth in Example 7, except that the reaction mixture was allowed to stand for 2½ hours at 100°. After cooling, the mixture was mixed with methanol, the crystals were vacuum-filtered, digested in hot water, and recrystallized from acetonitrile. Yield: 103 mg. (12 percent of theory) of 4-fluoro-7-chloro-3-methyl-2(5-nitro-1-methyl-2-imidazolyl-methylene)-1-indanone, m.p. 225°.

|  | C | H | N | Cl |
|---|---|---|---|---|
| Calculated: | 53.67 | 3.31 | 12.52 | 10.56 |
| Found: | 53.86 | 3.65 | 12.62 | 10.30 |

EXAMPLE 80

375 mg. (2.5 mmol) of 6-hydroxy-3-benzofuranone was treated and worked up as described in Example 41. Yield: 127 mg. (18 percent of theory) of 6-hydroxy-2-(5-nitro-1-methyl-2-imidazolyl-methylene)-3-benzofuranone; m.p. above 290°.

EXAMPLE 81

2.07 g. of sodium was dissolved in 120 ml. of ethanol, and 14.6 g. (90 mmol) of 6-hydroxy-1-tetralone, 22.5 g. of 2-bromoethanol, and 0.4 g. of potassium iodide were added to the reaction mixture. After boiling for 48 hours under a nitrogen atmosphere, the reaction mixture was evaporated to dryness under a vacuum, mixed with 200 ml. of water, and extracted with ethyl acetate. The ethyl acetate solutions were washed with 1N hydrochloric acid and water, dried, filtered, and concentrated to dryness. Dilution of the residue with ether resulted in 14.7 g. (79 percent of theory) of 6-(2-hydroxyethoxy)-1-tetralone, m.p. 89°–91°.

|  | C | H |
|---|---|---|
| Calculated: | 69.89 | 6.85 |
| Found: | 69.62 | 7.00 |

515 mg. (2.5 mmol) of this compound was reacted and worked up as set forth in Example 41. Recrystallization from dimethylformamide yielded 215 mg. (22 percent of theory) of 6-2-acetoxyethoxy)-2-(5-nitro-1-methyl-2-imidazolyl-methylene)-1-tetralone, m.p. 168°.

|  | C | H | N |
|---|---|---|---|
| Calculated: | 59.21 | 4.97 | 10.91 |
| Found: | 59.68 | 5.08 | 10.69 |

EXAMPLE 82

438 mg. (2.5 mmol) of 6-methylamino-1-tetralone was treated as set forth in Example 41. After cooling and mixing with methanol, a crystallized product was obtained which was discarded. The filtrate resulted, after 16 hours at 4°, in a second crystallized product which was filtered in benzene/acetone, 2:1, over 1 g. of silica gel. After evaporation under vacuum and recrystallization of the residue from isopropanol, 50 mg. (6 percent of theory) of 6-methylamino-2-(5-nitro-1-methyl-2-imidazolylmethylene)-1-tetralone, m.p. 235°, was obtained.

|  | N |
|---|---|
| Calculated: | 17.94 |
| Found: | 17.89 |

EXAMPLE 83

388 mg. (2.5 mmol) of 7-hydroxy-4-chromanone was treated and worked up as described in Example 41. Yield: 40 mg. (5 of theory) of 7-hydroxy-3-(5-nitro-1-methyl-2-imidazolyl-methylene)-4-chromanone, m.p. above 290°.

|  | C | H | N |
|---|---|---|---|
| Calculated: | 55.81 | 3.68 | 13.95 |
| Found: | 55.79 | 3.68 | 13.55 |

EXAMPLE 84

410 mg. (2.5 mmol) of 4-isothiachromanone was treated and worked up as set forth in Example 41. Yield: 156 mg. (21 percent of theory) of 3-(5-nitro-1-methyl-2-imidazolyl-methylene)-4-isothiachromanone, m.p. 210°.

|  | N | S |
|---|---|---|
| Calculated: | 13.95 | 10.64 |
| Found: | 13.48 | 10.79 |

EXAMPLE 85

2 g. (8.8 mmol) of 5-nitro-1-(2-acetoxyethyl )-2-imidazolyl aldehyde and 1.43 g. (8.8 mmol) of 5-methoxy-1-indanone were left in 8.8 ml. of acetic anhydride with 1.23 g. of anhydrous sodium acetate for 8 hours at 100°. After cooling, vacuum-filtering, and digestion of the precipitate with hot water, 0.84 g. (26 percent of theory) of 5-methoxy-2-[5-nitro-1-(2-acetoxyethyl)-2-imidazolyl-methylene]-1-indanone was obtained, m.p. 190°.

|  | C | H | N |
|---|---|---|---|
| Calculated: | 58.22 | 4.62 | 11.32 |
| Found: | 57.84 | 4.59 | 11.43 |

EXAMPLE 86

500 mg. (1.35 mmol) of 5-methoxy-2-[5-nitro-1-(2-acetoxyethyl )-2-imidazolyl-methylene]-1-indanone was boiled in 10.8 ml. of ethanol and 5.4 ml. of concentrated hydrochloric acid for 2 hours. Cooling, mixing with 5 ml. of water, and vacuum-filtering resulted in 388 mg. (87 percent of theory) of 5-methoxy-2-[5-nitro-1-(2-hydroxyethyl )-2-imidazolyl-methylene]-1-indanone, m.p. 229°.

|  | C | H | N |
|---|---|---|---|
| Calculated: | 58.36 | 4.60 | 12.76 |
| Found: | 57.72 | 4.83 | 12.94 |

EXAMPLE 87

264 mg. (2 mmol) of 1-indanone was reacted with 1-methyl-2-imidazolyl aldehyde as described in Example 73, yielding 325 mg. (72 percent of theory) of 2-(1-methyl-2-imidazolyl-methylene)-1-indanone, m.p. 193°–195°. 300 mg. of this compound was nitrated as described in Example 73. Yield after preparative layer chromatography: 17 mg. (4 percent of theory) of 2-(5-nitro-1-methyl-2-imidazolyl-methylene)-1-indanone, m.p. 250°–251°.

EXAMPLE 88

440 mg. (2.5 mmol) of 7-hydroxy-3,4-dimethyl-1-indanone was treated and worked up as described in Example 41. Recrystallization from dimethylformamide yielded 33 mg. (5 percent of theory) of 7-hydroxy-3,4-dimethyl-2-(5-nitro-1-methyl-2-imidazolyl-methylene)-1-indanone, m.p. 193°–195°. The structure was confirmed by the mass spectrum (the molecular peak, for example, is at 313).

EXAMPLE 89

3.76 g. (9.76 mmol) of 6-(2-acetoxyethoxy)-2-(5-nitro-1-methyl-2-imidazolyl-methylene)-1-tetralone was boiled in 78 ml. of alcohol and 39 ml. of concentrated hydrochloric acid for 2 hours. After cooling, the reaction mixture was poured into 234 ml. of water, and the precipitate was vacuum-filtered. Yield: 2.79 g. (83 percent of theory) of 6-(2-hydroxyethoxy)-2-(5-nitro-1-methyl-2-imidazolyl-methylene)-1-tetralone, m.p. 229°–232°.

|  | C | H | N |
|---|---|---|---|
| Calculated: | 59.47 | 5.00 | 12.24 |
| Found: | 59.88 | 5.27 | 12.30 |

EXAMPLE 90

343 mg. (1 mmol) of 6-(2-hydroxyethoxy)-2-(5-nitro-1-methyl-2-imidazolyl-methylene)-1-tetralone was dissolved in 4 ml. of pyridine under slight heating. After the addition of 191 mg. (1 mmol) of p-toluenesulfonyl chloride, the reaction mixture was agitated for 3 hours at room temperature, poured into 20 ml. of ethanol, and vacuum-filtered. Yield: 424 mg. (85 percent of theory) of 6-(2-p-toluenesulfonyloxyethoxy)-2-(5-nitro-1-methyl-2-imidazolyl-methylene)-1-tetralone; m.p. 193°–196°.

|  | N | S |
|---|---|---|
| Calculated: | 8.45 | 6.45 |
| Found: | 9.04 | 6.12 |

EXAMPLE 91

10 g. (0.07 mol) of dimethylaminoethyl chloride hydrochloride and 2.8 g. (0.07 mol) of NaOH were dissolved in 20 ml. of water, extracted with benzene, and the benzenic solution was dried over $K_2CO_3$ under agitation for 48 hours.

1.2 g. (0.052 mol) of sodium was dissolved in 50 ml. of ethanol; then, 8.1 g. (0.05 mol) of 6-hydroxy-1-tetralone was added thereto. The freshly prepared solution of dimethyl aminoethyl chloride and a spatula tip amount of KI were added to this reaction solution. The latter was stirred for 20 hours under reflux, then decanted off from the precipitated NaCl; the solution was concentrated, the residue was taken up in $H_2O$ and extracted with ethyl acetate. The organic phase was dried over $Na_2SO_4$ and concentrated. The oily residue was dissolved in ether and mixed with ethereal HCl. The thus-precipitated solid product was vacuum-filtered and recrystallized from isopropanol. Yield: 7.4 g. (55 percent of theory) of 6-(2-dimethylaminoethoxy)-1-tetralone, hydrochloride; m.p. 173°–174°.

|  | N | Cl |
|---|---|---|
| Calculated: | 5.19 | 13.13 |
| Found: | 5.20 | 13.19 |

673 mg. (2.5 mmol) of 6-(2-dimethylaminoethoxy)-1-tetralone, hydrochloride, was reacted as described in Example 41. The reaction mixture was worked up by pouring same into 10 ml. of water, concentrating the reaction solution under vacuum almost to dryness, and diluting the residue with methanol/ether, as well as subsequent vacuum-filtering. Yield: 280 mg. (24 percent of theory) of 6-(2-dimethylaminoethoxy)-2(5-nitro-1-methyl-2-imidazolyl-methylene)-1-tetralone as the sulfate; m.p. 196/200°–204°.

|  | N | S |
|---|---|---|
| Calculated: | 11.96 | 6.85 |
| Found: | 11.49 | 7.05 |

EXAMPLE 92

658 mg. (2 mmol) of 5-(2-hydroxyethoxy)-2-(5-nitro-1-methyl-2-imidazolyl-methylene)-1-indanone was boiled in 2 ml. of thionyl chloride for 1 hour under reflux. The reaction mixture was cooled, and then concentrated to dryness under vacuum. The residue was recrystallized from dimethylformamide. Yield: 416 mg. (60 percent of theory) of 5-(2-chloroethoxy)-2-(5- nitro-1-methyl-2-imidazolyl-methylene)-1-indanone; m.p. 238/242°–246°.

|  | N | Cl |
|---|---|---|
| Calculated: | 12.09 | 10.20 |
| Found: | 11.73 | 9.35 |

EXAMPLE 93

718 mg. (2 mmol) of 4'-(2-acetoxyethoxy)-2-(5-nitro-1-methyl-2-imidazolyl-methylene)-acetophenone was boiled in 16 ml. of ethanol and 8 ml. of concentrated hydrochloric acid for 2 hours under reflux. During the boiling step, the substance was dissolved, and a new precipitate was formed. The product was cooled and vacuum-filtered. Yield: 599 mg. (85 percent of theory) of 4'-(2-hydroxyethoxy)-2-(5-nitro-1-methyl-2-imidazolyl-methylene)-acetophenone, hydrochloride; m.p. 204/207°–210°.

|  | N | Cl |
|---|---|---|
| Calculated: | 11.90 | 9.96 |
| Found: | 11.80 | 9.89 |

EXAMPLE 94

353 mg. (1 mmol) of 4'-(2-hydroxyethoxy)-2-(5-nitro-1-methyl-2-imidazolyl-methylene)-acetophenone, hydrochloride, was reacted as described in Example 90. The reaction mixture was worked up by pouring into 10 ml. of ice water and vacuum-filtering the crystalline product. Yield: 402 mg. (85 percent of theory) of 4'-(2-p-toluenesulfonyloxyethoxy)-2-(5-nitro-1-methyl-2-imidazolyl-methylene)-acetophenone; m.p. 144°–146°.

|  | N | S |
|---|---|---|
| Calculated: | 8.91 | 6.80 |
| Found: | 8.98 | 6.71 |

EXAMPLE 95

942 mg. (2 mmol) of 4'-(2-p-toluenesulfonyloxyethoxy)-2(5-nitro-1-methyl-2-imidazolyl-methylene)-acetophenone was dissolved in 4 ml. of absolute dioxane and, after the addition of 0.2 ml. (2.3 mmol) of morpholine, heated for 2 hours to 100°. The reaction mixture was evaporated to dryness under vacuum. The residue was taken up in 10 ml. of ethyl acetate and 5 ml. of water. The water phase was separated, and the ethyl acetate phase was washed once with water (2 ml.), dried over MgSO₄, and evaporated. The residue was recrystallized from ethyl acetate. Yield: 436 mg. (56 percent of theory) of 4'-(2-morpholinoethoxy)-2-(5-nitro-1-methyl-2-imidazolyl-methylene)-acetophenone; m.p. 160°–161.5°.

|  | C | H | N |
|---|---|---|---|
| Calculated: | 59.06 | 5.75 | 14.50 |
| Found: | 58.71 | 5.76 | 14.16 |

The product was dissolved in methanol and, by the addition of ethereal hydrochloric acid, the hydrochloride of the compound was precipitated; m.p. 201/205°–BR206°.

EXAMPLE 96

339 mg. (2.5 mmol) of 4'-aminoacetophenone was reacted and worked up as described in Example 41. The crude product was recrystallized from acetonitrile. Yield: 130 mg. (17 percent of theory) of 4'-acetylamino-2(5-nitro-1-methyl-2-imidazolyl-methylene)-acetophenon; m.p. 222°–225°.

|  | C | H | N |
|---|---|---|---|
| Calculated: | 57.40 | 4.49 | 17.85 |
| Found: | 56.90 | 4.96 | 18.42 |

EXAMPLE 97

1.39 g. (4.42 mmol) of 4'-acetylamino-2-(5-nitro-1-methyl-2-imidazolyl-methylene)-acetophenone was boiled under reflux in 35.4 ml. of ethanol and 17.7 ml. of concentrated hydrochloric acid for 2 hours. The reaction mixture was cooled and vacuum-filtered. Yield: 684 mg. (52 percent of theory) of 4'-amino-2-(5-nitro-1-methyl-2-imidazolyl-methylene)-acetophenone, hydrochloride; m.p. 210° (decomposition).

|  | N | Cl |
|---|---|---|
| Calculated: | 18.15 | 11.48 |
| Found: | 17.60 | 10.44 |

EXAMPLE 98

375 mg. (2.5 mmol) of 4'-methyl-3'-hydroxyacetophenone was reacted and worked up as set forth in Example 41. Yield: 387 mg. (54 percent of theory) of 4'-methyl-3'-hydroxy-2-(5-nitro-1-methyl-2-imidazolyl-methylene)-acetophenone; m.p. > 290°.

|  | C | H | N |
|---|---|---|---|
| Calculated: | 58.53 | 4.57 | 14.62 |
| Found: | 58.22 | 4.83 | 14.48 |

EXAMPLE 99

380 mg. (2.5 mmol) of 3',4'-dihydroxyacetophenone was reacted and worked up as described in Example 41. Yield: 464 mg. (64 percent of theory) of 3',4'-dihydroxy-2-(5-nitro-1-methyl-2-imidazolyl-methylene)-acetophenone; m.p. > 290°.

|  | C | H | N |
|---|---|---|---|
| Calculated: | 53.98 | 3.84 | 14.53 |
| Founded: | 53.87 | 4.15 | 14.08 |

EXAMPLE 100

450 mg. (2.5 mmol) of 2',4'-dimethoxyacetophenone was reacted and worked up as described in Example 41. Yield; 219 mg. (27 percent of theory) of 2',4'-dimethoxy-2-(5-nitro-1-methyl-2-imidazolyl-methylene)-acetophenone; m.p. 124°–126°.

|  | C | H | N |
|---|---|---|---|
| Calculated: | 56.79 | 4.77 | 13.25 |
| Found: | 57.30 | 5.16 | 12.76 |

EXAMPLE 101

471 mg. (1 mmol) of 4'-(2-p-toluenesulfonyloxyethoxy)-2-(5-nitro-1-methyl-2imidazolyl-methylene)-acetophenone was dissolved in 2 ml. of absolute dioxane and heated, with the addition of 142 mg. (2 mmol) of pyrrolidine, for 2 hours to 100°. The reaction mixture was concentrated to dryness under vacuum, and the residue was taken up in 10 ml. of ethyl acetate and 10 ml. of water. The aqueous phase was separated, and the ethyl acetate phase was washed once with 5 ml. of H$_2$O, dried over MgSO$_4$, and evaporated. The residue was recrystallized from isopropanol/water, dissolved in methanol, and precipitated with ethereal hydrochloric acid. Yield: 105 mg. (27 percent of theory) of 4'-(2-pyrrolidinoethoxy)-2-(5-nitro-1-methyl-2-imidazolyl-methylene)-acetophenone, dihydrochloride, m.p. 200°–202°.

|  | N | Cl |
|---|---|---|
| Calculated: | 12.64 | 16.00 |
| Found: | 12.19 | 15.58 |

EXAMPLE 102

200 g. of 6,7-dimethoxy-2-(5-nitro-1-methyl-2-imidazolyl-methylene)-3-benzofuranone, 105.34 g. of corn starch, 8.0 g. of white gelatin, 6.5 g. of talc, 0.112 g. of methyl p-hydroxybenzoate, and 0.048 g. of propyl p-hydroxybenzoate are mixed homogeneously and compressed into tablets of 320 mg. in the usual manner in a tablet compressing machine.

EXAMPLE 103

2.0 g. of 6-hydroxy-2-(5-nitro-1-methyl-2-imidazolylmethylene)-4-tetralone, 27.0 g. of lactose, 45.565 g. of corn starch, 4.0 g. of talc, 1.4 g. of white gelatin, 0.024 g. of methyl p-hydroxybenzoate, and 0.011 g. of propyl p-hydroxybenzoate are mixed homogeneously and compressed into tablets of 80 mg. in the usual manner in a tablet compressing machine.

EXAMPLE 104

10 g. of 6-acetoxy-5-methoxy-2-(5-nitro-1-methyl-2-imidazolyl-methylene)-1-indanone, 60 g. of lactose, 4.9 g. of corn starch, 800 mg. of magnesium stearate, 8 mg. of methyl p-hydroxybenzoate, and 3.5 mg. of propyl p-hydroxybenzoate are mixed homogeneously and processed in the usual manner by compressing into vaginal tablets of 750 mg.

EXAMPLE 105

11.5 g. (70 mmol) of diethylaminoethyl chloride hydrochloride and 2.8 g. (70 mmol) of NaOH were dissolved in 20 ml. of water, extracted with benzene, and the benzenic solution was dried for 48 hours under stirring, over potassium carbonate. 1.2 g. (52 mmol) of sodium was dissolved in 50 ml. of ethanol, and then 7.4 g. (50 mmol) of 5-hydroxy-1-indanone was added thereto. The freshly prepared solution of diethylaminoethyl chloride and a spatula tip amount of potassium iodide were added to this reaction solution. The reaction mixture was stirred under reflux for 24 hours; then, the reaction mixture was evaporated to dryness under vacuum, the residue was taken up in water, and extracted with ethyl acetate. The organic phase was dried over magnesium sulfate and concentrated. The oily residue was dissolved in ether and mixed with ethereal HCl. The thus-precipitated solid product was vacuum-filtered.

Yield: 8.66 g. (61 percent of theory) of 5-(2-diethylaminoethoxy)-1-indanone, hydrochloride; m.p. 173°–175°.

567 mg. (2 mmol) of 5-(2-diethylaminoethoxy)-1-indanone, hydrochloride, and 310 mg. (2 mmol) of 5-nitro-1-methyl-2-imidazolyl aldehyde were stirred in 2.04 ml. of glacial acetic acid and 0.121. ml. (2.2 mmol) of concentrated sulfuric acid for 6 hours at 100°. The reaction mixture was evaporated almost to dryness under vacuum, the residue was diluted with methanol, and the crystalline solid product was vacuum-filtered. Yield: 334 mg. (35 percent of theory) of 5-(2-diethylaminoethoxy)-2-(5-nitro-1-methyl-2-imidazolyl-methylene)-1-indanone, sulfate; m.p. 194°–196.5°.

EXAMPLE 106

9.6 g. (50 mmol) of 5-(2-hydroxyethoxy)-1-indanone and 9.5 g. (50 mmol) of p-toluenesulfonyl chloride were stirred in 100 ml. of pyridine for 1.5 hours at room temperature. The reaction mixture was poured into 500 ml. of ice water, and the crystalline solid product was vacuum-filtered. Yield: 12.2 g. of 5-(2-p-toluenesulfonyloxyethoxy)-1-indanone (70 percent of theory); m.p. 94° C.

6.92 g. (20 mmol) of 5-(2-p-toluenesulfonyloxyethoxy)-1-indanone and 5.68 g. (80 mmol) of pyrrolidine were boiled under reflux in 200 ml. of ethanol for 3 hours. After evaporating to dryness under vacuum, the reaction product was taken up in water and 2H NaOH and extracted with ethyl acetate. The organic phase was dried over MgSO$_4$ and concentrated. The oily residue was dissolved in ether and mixed with ethereal HCl. The thus-precipitated solid product was vacuum-filtered. Yield: 2.5 g. (45 percent of theory) of 5-(2-pyrrolidinoethoxy)-1-indanone, hydrochloride.

2.5 g. (8.9 mmol) of 5-(2-pyrrolidinoethoxy)-1-indanone, hydrochloride, and 1.38 g. (8.9 mmol) of 5-nitro-1-methyl-2-imidazolyl aldehyde were reacted as described in Example 105 and worked up.

Yield: 0.75 g. (18 percent of theory) of 5-(2-pyrrolidinoethoxy)-2-(5-nitro-1-methyl-2-imidazolyl-methylene)-1-indanone, sulfate; m.p. 224°–225°.

EXAMPLE 107

1.38 g. (4 mmol) of 5-(2-p-toluenesulfonyloxyethoxy)-1-indanone and 1.36 g. (16 mmol) of piperidine were reacted in 40 ml. of ethanol and worked up, as described in Example 106. Yield: 0.96 g. of 5-(2-piperidinoethoxy)-1-indanone hydrochloride (81 percent of theory), m.p. 188°–190°.

387 mg. (3 mmol) of 5-(2-piperidinoethoxy)-1-indanone, hydrochloride, and 465 mg. (3 mmol) of 5-nitro-1-methyl-2-imidazolyl aldehyde were reacted and worked up as set forth in Example 105. Yield: 340 mg. (23 percent of theory) of 5-(2-piperidinoethoxy)-2-(5-nitro-1-methyl-2-imidazolyl-methylene)-1-indanone, sulfate; m.p. 224°–226°.

EXAMPLE 108

1.38 g. (4 mmol) of 5-(2-p-toluenesulfonyloxyethoxy)-1-indanone and 1.6 g. (16 mmol) of 1-methylpiperazine were reacted in 40 ml. of ethanol and worked up, as described in Example 106. Yield: 1.17 g. (94 percent of theory) of 5-[2-(4-methylpiperazino)-ethoxy]-1-indanone, hydrochloride; m.p. 234°–236°.

1.09 g. (3.5 mmol) of 5-[2-(4-methylpiperazino)-ethoxy]-1-indanone, hydrochloride and 0.543 g. (3.5 mmol) of 5-nitro-1-methyl-2-imidazolyl aldehyde were reacted and worked up as set forth in Example 105. Yield: 0.55 g. (31 percent of theory) of 5-[2-(4-methyl-piperazino)-ethoxy]-2-(5-nitro-1-methyl-2-imidazolyl-methylene)-1-indanone, sulfate; m.p. 206°–209°.

EXAMPLE 109

1.73 g. (5 mmol) of 5-(2-p-toluenesulfonyloxyethoxy)-1-indanone and 1.75 g. (20 mmol) of morpholine were reacted in 30 ml. of ethanol and worked up, as described in Example 106. Yield: 1.18 g. (77 percent of theory) of 5-(2-morpholinoethoxy)-1-indanone, hydrochloride; m.p. 218°–222°.

1.1 g. (3.7 mmol) of 5-(2-morpholinoethoxy)-1-indanone, hydrochloride, and 0.574 g. (3.7 mmol) of 5-nitro-1-methyl-2-imidazolyl aldehyde were reacted as set forth in Example 105 and worked up. Yield: 0.51 g. (27 percent of theory) of 5-(2-morpholinoethoxy)-2-(5-nitro-1-methyl-2-imidazolyl-methylene)-1-indanone, sulfate; m.p. 249°–252°.

EXAMPLE 110

1.38 g. (4 mmol) of 5-(2-p-toluenesulfonyloxyethoxy)-1-indanone and 1.58 g. (16 mmol) of perhydrozepine were reacted in 40 ml. of ethanol and worked up, as described in Example 106. Yield: 0.67 g. (54 percent of theory) of 5-[2-(1-perhydroazepinyl)-ethoxy]-1-indanone, hydrochloride; m.p. 177°–179°.

618 mg. (2 mmol) of 5-[2-(1-perhydroazepinyl)-ethoxy]-1-indanone, hydrochloride, and 310 mg. (2 mmol) of 5-nitro-1-methyl-2-imidazolyl aldehyde were reacted and worked up as described in Example 105. Yield: 210 mg. (21 percent of theory) of 5-[2-(1-perhydroazepinyl)-ethoxy]-2-(5-nitro-1-methyl-2-imidazolyl-methylene)-1-indanone, sulfate; m.p. 212°–214°.

4.92 g. (33.3 mmol) of 4-hydroxyl-1-indanone was reacted with dimethylaminoethyl chloride and worked up, as set forth in Example 105. Yield: 4.4 g. (52 percent of theory) of 4-(2-dimethyl aminoethoxy)-1-indanone, hydrochloride; m.p. 184°–186°.

637 mg. (2.5 mmol) of 4-(2-dimethylaminoethoxy)-1-indanone, hydrochloride, and 388 mg. (2.5 mmol) of 5-nitro-1-methyl-2-imidazolyl aldehyde were reacted and worked up as described in Example 105. Yield: 750 mg. (66 percent of theory) of 4-(2-dimethylaminoethoxy)-2-(5-nitro-1-methyl-2-imidazolyl-methylene)-1-indanone, sulfate; m.p. 225°–227°.

EXAMPLE 112

5.44 g. (37 mmol) of 5-amino-1-indanone in 25 ml. of water was mixed dropwise at 80° simultaneously with 36 ml. of dimethyl sulfate and 15.5 g. of NaOH in 60 ml. of water. After cooling, the reaction mixture was extracted with ethyl acetate. The organic phase was dried over MgSO₄ and concentrated. After recrystallization of the residue from 50 percent aqueous methanol, 1.2 g. (19 percent of theory) of 5-dimethylamino-1-indanone was obtained, m.p. 105°–107°.

438 mg. (2.5 mmol) of 5-dimethylamino-1-indanone and 388 mg. (2.5 mmol) of 5-nitro-1-methyl-2-imidazolyl aldehyde were reacted as described in Example 7. The crude product was digested with methanol, thus obtaining 128 mg. (16 percent of theory) of 5-dimethylamino-2-(5-nitro-1-methyl-2-imidazolyl-methylene)-1-indanone; m.p. > 290°.

EXAMPLE 113

19.27 g. (93.5 mmol) of 6-(2-hydroxyethoxy)-1-tetralone was reacted with 19.5 g. (102.85 mmol) of p-toluenesulfonyl chloride and worked up, as described in Example 106. Yield: 28.6 g. (85 percent of theory) of 6-(2-p-toluenesulfonyloxyethoxy)-1-tetralone; m.p. 106°–108°.

3.6 g. (10 mmol) of 6-(2-p-toluenesulfonyloxyethoxy)-1-tetralone and 3.48 g. (40 mmol) of morpholine were reacted and worked up as described in Example 106. Yield: 1.73 g. (56 percent of theory) of 6-(2-morpholinoethoxy)-1-tetralone, hydrochloride; m.p. 194°–196°.

1.87 g. (6 mmol) of 6-(2-morpholinoethoxy)-1-tetralone, hydrochloride, and 0.93 g. (6 mmol) of 5-nitro-1-methyl-2-imidazolyl aldehyde were agitated in 6.12 ml. of glacial acetic acid and 0.363 ml. (6.6 mmol) of concentrated sulfuric acid for 6 hours at 100°. After cooling, the reaction mixture was mixed with methanol and vacuum-filtered, thus producing 1.04 g. (34 percent of theory) of 6-(2-morpholinoethoxy)-2-(5-nitro-1-methyl-2-imidazolyl-methylene)-1-tetralone, sulfate; m.p. 223°–224°.

EXAMPLE 114

3.6 g. (10 lmmol) of 6-(2-toluenesulfonyloxyethoxy)-1-tetralone and 2.84 g. (40 mmol) of pyrrolidine were reacted and worked up as described in Example 106. Yield: 2.28 g. (77 percent of theory) of 6-(2-pyrrolidinoethoxy)-1-tetralone, hydrochloride; m.p. 200°–203°.

591 mg. (2 mmol) of 6-(2-pyrrolidinoethoxy)-1-tetralone, hydrochloride, and 310 mg. (2 mmol) of 5-nitro-1-methyl-2-imidazolyl aldehyde were reacted and worked up as described in Example 105. Yield: 216 6mg. (22 percent of theory) of 6-(2-pyrrolidinoethoxy)-2-(5-nitro-1-methyl-2-imidazolyl-methylene)-1-tetralone, sulfate; m.p. 198°–200°.

EXAMPLE 115

473 mg. (2.5 mmol) of 5-acetamino-1-indanone and 423 mg. (2.5 mmol) of 5-nitro-1-ethyl-2-imidazolyl aldehyde were reacted as set forth in Example 7. The crude product was digested with methanol, thus obtaining 206 mg. (24 percent of theory) of 5-acetamino-2-(5-nitro-1-ethyl-2-imidazolyl-methylene)-1-indanone; m.p. 268°–269°.

EXAMPLE 116

680 mg. (2 mmol) of 5-acetamino-2-(5-nitro-1-ethyl-2-imidazolyl-methylene)-1-indanone was reacted as described in Example 76, thus obtaining 550 mg. (92 percent of theory) of 5-amino-2-(5-nitro-1-2-imidazolyl-methylene)-1-indanone; m.p. 290°.

EXAMPLE 117

4.73 g. (25 mmol) of 5-acetamino-1-indanone and 4.92 g. (25 mmol) of 5-nitro-1-butyl-2-imidazolyl aldehyde were reacted and worked up as described in Example 115. Yield: 2.19 g. (24 percent of theory) of 5-acetamino-2-(5-nitro-1-butyl-2-imidazolyl-methylene)-1-indanone; m.p. 240°–242°.

EXAMPLE 118

736 mg. (2 mmol) of 5-acetamino-2-(5-nitro-1-butyl-2-imidazolyl-methylene)-1-indanone was reacted as described in Example 76. Yield: 444 mg. (68 percent of theory) of 5-amino-2-(5-nitro-1-butyl-2-imidazolyl-methylene)-1-indanone, hydrochloride; m.p. 222°.

EXAMPLE 119

4.73 g. (25 mmol) of 5-acetamino-1-indanone and 5.68 g. (25 mmol) of 5-nitro-1-(2-acetoxyethyl)-2-imidazolyl aldehyde were reacted and worked up as set forth in Example 115. Yield: 2.27 g. (23 percent of theory) of 5-acetamino-2-[5-nitro-1-(2-acetoxyethyl)-2-imidazolyl-methylene]-1-indanone; m.p. 227°–228°.

EXAMPLE 120

290 mg. (0.73 mmol) of 5-acetamino-2-[5-nitro-1-(2-acetoxyethyl)-2-imidazolyl-methylene]-1-indanone was reacted as described in Example 76. Yield: 166 mg. (73 percent of theory) of 5-amino-2-[5-nitro-1-(2-hydroxyethyl)-2-imidazolyl-methylene-]-1-indanone; m.p. 290°–292°.

EXAMPLE 121

353 mg. (1 mmol) of 4'-(2-hydroxyethoxy)-2-(5-nitro-1-methyl-2-imidazolyl-methylene)-acetophenone, hydrochloride, was reacted and worked up as described in Example 92. Yield: 280 mg. (83 percent of theory) of 4'-(2-chloroethoxy)-2-(5-nitro-1-methyl-2-imidazolyl-methylene)-acetophenone; m.p. 130°–132°.

EXAMPLE 122

264 mg. (0.55 mmol) of 4'-(2-p-toluenesulfonyloxy-ethoxy)-2-(5-nitro-1-methyl-2-imidazolyl-methylene)-acetophenone was reacted with 0.11 ml. (1.26 mmol) of morpholine and worked up, as described in Example 101. Yield: 236 mg. (97 percent of theory) of 4'-(2-morpholinoethoxy)-2-(5-nitro-1-methyl-2-imidazolyl-methylene)-acetophenone, hydrochloride; m.p. 186°–190°.

EXAMPLE 123

1.8 g. (10 mmol) of 4'-(2-hydroxyethoxy)-acetophenone and 1.9 g. (10 mmol) of p-toluenesulfonyl chloride were stirred in 20 ml. of pyridine for 2 hours at room temperature, then poured into 100 ml. of water, and the crystalline solid product was vacuum-filtered. Yield: 2.1 g. (61 percent of theory) of 4'-(2-p-toluenesulfonyloxyethoxy)-acetophenone; m.p. 82°–84°.

1.67 g. (5 mmol) of 4'-(2-p-toluenesulfonyloxy-ethoxy)-acetophenone and 1.42 g. (20 mmol) of pyrrolidine were reacted and worked up as described in Example 106. Yield: 0.7 g. (82 percent of theory) of 4'-(2-pyrrolidinoethoxy)-acetophenone, hydrochloride; m.p. 128°–130°.

674 mg. (2.5 mmol) of 4'-(2-pyrrolidinoethoxy)-acetophenone, hydrochloride, and 388 mg. (2.5 mmol) of 5-nitro-1-methyl-2-imidazolyl aldehyde were reacted and worked up as set forth in Example 105. Yield: 503 mg. (43 percent of theory) of 4'-(2-pyrrolidinoethoxy)-2-(5-nitro-1-methyl-2-imidazolyl-methylene)-acetophenone, sulfate; m.p. 182°–184°.

EXAMPLE 124

6.8 g. (50 mmol) of 4'-hydroxyacetophenone was reacted with dimethylaminoethyl chloride and worked up, as described in Example 105. Yield: 4.3 g. (35 percent of theory) of 4'-(2-dimethylaminoethoxy)-acetophenone, hydrochloride; m.p. 162°–163°.

608 mg. (2.5 mmol) of 4'-(2-dimethylaminoethoxy)-acetophenone, hydrochloride, and 388 mg. (2.5 mmol) of 5-nitro-1-methyl-2-imidazolyl aldehyde were reacted and worked up as described in Example 113. Yield: 497 mg. (45 percent of theory) of 4'-(2-dimethylaminoethoxy)-2-(5-nitro-1-methyl-2-imidazolyl-methylene)-acetophenone, sulfate; m.p. 183°–185°.

EXAMPLE 125

5 g. (37 mmol) of 4'-aminoacetophenone in 25 ml. of water was mixed dropwise at 80° simultaneously with 12 ml. of dimethyl sulfate and 5.15 g. of NaOH in 20 ml. of water. After cooling, the reaction mixture was vacuum-filtered, and the precipitate was recrystallized from 70 percent aqueous methanol, thus obtaining 4.2 g. of 4'-dimethylaminoacetophenone (70 percent of theory); m.p. 102°–103°.

408 mg. (2.5 mmol) of 4'-dimethylaminoacetophenone and 388 mg. (2.5 mmol) of 5-nitro-1-methyl-2-imidazolyl aldehyde were reacted and worked up as described in Example 41. Yield: 250 mg. (33 percent of theory) of 4'-dimethylamino-2-(5-nitro-1-methyl-2-imidazolyl-methylene)-acetophenone; m.p. 237°–238°.

EXAMPLE 126

147 mg. (1 mmol) of 5-amino-1-indanone and 228 mg. (1.2 mmol) of p-toluenesulfonyl chloride were boiled under reflux in 2 ml. of pyridine for 1.5 hours. After cooling, the reaction mixture was poured into 10 ml. of water, and the crystalline solid product was vacuum-filtered; yield; 287 mg. of 5-p-toluenesulfonylamino-1-indanone. This product and 103 mg. (0.67 mmol) of 5-nitro-1-methyl-2-imidazolyl aldehyde were reacted and worked up as described in Example 7. Yield: 220 mg. (75 percent of theory) of 5-p-toluenesulfonylamino-2-(5-nitro-1-methyl-2-imidazolyl methylene)-1-indanone; m.p. 274°–275°.

EXAMPLE 127

637 mg. (2.5 mmol) of 5-(2-dimethylaminoethoxy)-1-indanone, hydrochloride, and 388 mg. (2.5 mmol) of 5-nitro-1-methyl-2-imidazolyl aldehyde were agitated in 2.55 ml. of glacial acetic acid and 0.151 ml. (2.75 mmol) of concentrated sulfuric acid for 6 hours at 100°. After cooling, the reaction mixture was mixed with methanol and vacuum-filtered, thus obtaining 379 mg. (33 percent of theory) of 5-(2-dimethylaminoethoxy)-2-(5-nitro-1-methyl-2-imidazolyl-methylene)-1-indanone, sulfate; m.p. 208°–210°.

|  | C | H | N | S |
|---|---|---|---|---|
| Calculated: | 47.57 | 4.88 | 12.32 | 7.06 |
| Found: | 47.46 | 5.00 | 12.50 | 6.91 |

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula

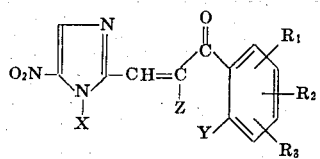

wherein X is a saturated or unsaturated hydrocarbon group containing one to five carbon atoms, or a free or esterified 2-hydroxyethyl group; Y and Z each are hydrogen atoms or, collectively, (a) —$CH_2$—; (b) one of —O—, —S—, —SO— and —$SO_2$—; (c) a combination of (a) and one of (b); (d) —$CH_2$—$CH_2$—; or (e) —CHA—, wherein A is —$CH_3$, —$C_2H_5$ or —$C_6H_5$; $R_1$, $R_2$ and $R_3$ each are H, alkyl of 1–5 carbon atoms, halogen, hydroxy, esterified hydroxy wherein the ester group is an ester of an aliphatic or aromatic carboxylic or sulfonic acid of one to 10 carbon atoms, etherified hydroxy wherein the ether group is alkoxy of one to five carbon atoms, alkyloxy or benzyloxy, and, additionally, $R_3$ can be alkyl of 1–5 carbon atoms substituted in the terminal position by halogen, hydroxy or esterified or etherified hydroxy as defined hereinabove, amino, alkylamino or dialkylamino wherein alkyl is of one to five carbon atoms, or heterocyclic amino containing four to 14 carbon atoms, up to three rings and one to three N-, O and S heteroatoms, including the amino nitrogen atom, aminoalkoxy wherein alkoxy contains two to five carbon atoms and amino is an amino group as defined hereinabove, or acylamido wherein acyl is the acyl radical or an aliphatic or aromatic carboxylic or sulfonic acid as defined hereinabove, and the pharmaceutically acceptable acid addition and quaternary ammonium salts thereof.

2. A compound of claim 1 wherein X is alkyl containing one to four carbon atoms.

3. A compound of claim 2 wherein X is $CH_3$.

4. A compound of claim 1 wherein Y and Z collectively are —$CH_2$—.

5. A compound of claim 1 wherein Y and Z collectively are —$CH_2CH_2$—.

6. A compound of claim 1 wherein Y and Z collectively are —O—.

7. A compound of claim 1 wherein Y and Z collectively are —$CH_2$—S—.

8. A compound of claim 1 wherein Y and Z each are H.

9. A compound of claim 1 wherein at least one of $R_1$, $R_2$ and $R_3$ is H.

10. A pharmaceutically acceptable acid addition salt of a compound of claim 1.

11. A compound of claim 4 selected from the group consisting of 5-methoxy-2-(5-nitro-1-methyl-2-imidazolyl-methylene)-1-indanone, 5-ethoxy-2-(5-nitro-1-methyl-2-imidazolyl-methylene)-1-indanone, 5-butoxy-2-(5-nitro-1-methyl-2-imidazolyl-methylene)-1-indanone, 4,5-dimethoxy-2-(5-nitro-1-methyl-2-imidazolyl-methylene)-1-indanone, 5-methoxy-6-acetoxy-2-(5-nitro-1-methyl-2-imidazolyl-methylene)-1-indanone, 4-methoxy-2-(5-nitro-1-methyl-2-imidazolyl-methylene)-1-indanone, 5-allyloxy-2-(5-nitro-1-methyl-2-imidazolyl-methylene)-1-indanone, 5-benzoxy-2-(5-nitro-1-methyl-2-imidazolyl-methylene)-1-indanone, 5,6-dimethoxy-2-(5-nitro-1-methyl-2-imidazolyl-methylene)-1-indanone, 6-methoxy-5-acetoxy-2-(5-nitro-1-methyl-2-imidazolyl-methylene)-1-indanone and 7-methoxy-2-(5-nitro-1-methyl-2-imidazolyl-methylene)-1-indanone and the pharmaceutically acceptable acid addition salts thereof.

12. A compound of claim 11, 5-methoxy-6-acetoxy-2-(5-nitro-1-methyl-2-imidazolyl-methylene)-1-indanone.

13. A compound of claim 11, 4,5-dimethoxy-2-(5-nitro-1-methyl-2-imidazolyl-methylene)-1-indanone.

14. A compound of claim 4 selected from the group consisting of 4-hydroxy-2-(5-nitro-1-methyl-2-imidazolyl-methylene)-1-indanone, 5-methoxy-6-hydroxy-2-(5-nitro-1-methyl-2-imidazolyl-methylene)-1-indanone, 5-hydroxy-2-(5-nitro-1-methyl-2-imidazolyl-methylene)-1-indanone, 7-hydroxy-2-(5-nitro-1-methyl-2-imidazolyl-methylene)-1-indanone, 5-hydroxy-6-methoxy-2-(5-nitro-1-methyl-2-imidazolyl-methylene)-1-indanone, 4-chloro-7-hydroxy-2-(5-nitro-1-methyl-2-imidazolyl-methylene)-1-indanone, 5,6-dihydroxy-2-(5-nitro-1-methyl-2-imidazolyl-methylene)-1-indanone, and 7-hydroxy-3,4-dimethyl-2-(5-nitro-1-methyl-2-imidazolyl-methylene)-1-indanone and the pharmaceutically acceptable acid addition salts thereof.

15. A compound of claim 4 selected from the group consisting of 5-acetoxy-2-(5-nitro-1-methyl-2-imidazolyl-methylene)-1-indanone, 4-acetoxy-2-(5-nitro-1-methyl-2-imidazolyl-methylene)-1-indanone, 7-acetoxy-2-(5-nitro-1-methyl-2-imidazolyl-methylene)-1-indanone, 5-cinnamoyloxy-2-(5-nitro-1-methyl-2-imidazolyl-methylene)-1-indanone, 5-acetoxy-2-(5-nitro-1-ethyl-2-imidazolyl-methylene)-1-indanone, 5-acetoxy-2-(5-nitro-1-allyl-2-imidazolyl-methylene)-1-indanone, 5-acetoxy-2-[5-nitro-1-(2-benzoyloxyethyl)-2-imidazoyl-methylene]-1-indanone, 4-bromo-7-acetoxy-2-(5-nitro-1-methyl-2-imidazoylmethylene)-1-indanone, 5-acetoxy-2-(5-nitro-1-butyl-2-imidazolyl-methylene)-1-indanone, 4-chloro-7-acetoxy-2-(5-nitro-1-methyl-2-imidazolyl-methylene)-1-indanone, 5-p-toluenesulfonyloxy-2-(5-nitro-1-methyl-2-imidazolyl-methylene)-1-indanone, 5-methoxy-2-[5-nitro-1-(2-acetoxyethyl)-2-imidazoyl-methylene]-1-indanone and 5-methoxy-2-[5-nitro-1-(2-hydroxyethyl)-2-imidazoyl-methylene]-1-indanone and the pharmaceutically acceptable acid addition salts thereof.

16. A compound of claim 4 selected from the group consisting of 5-chloro-2-(5-nitro-1-methyl-2-imidazolyl-methylene)-1-indanone, 2-(5-nitro-1-methyl-2-imidazolyl-methylene)-1-indanone, 6-methyl-2-(5-nitro-1-methyl-2-imidazolyl-methylene)-1-indanone, 6-chloro-2-(5-nitro-1-methyl-2-imidazolyl-methylene)-1-indanone, 3-methyl-2-(5-nitro-1-methyl-2-imidazolyl-methylene)-1-indanone, 4-methyl-2-(5-nitro-1-methyl-2-imidazolyl-methylene)-1-indanone, 6-isopropyl-2-(5-nitro-1-methyl-2-imidazolyl-methylene)-1-indanone, 4-chloro-2-(5-nitro-1-methyl-2-imidazoyl-methylene)-1-indanone, 3-phenyl-2-(5-nitro-1-methyl-2-imidazolyl-methylene)-1-indanone, and 4-fluoro-7-chloro-3-methyl-2-(5-nitro-1-methyl-2-imidazolyl-methylene)-1-indanone and the pharmaceutically acceptable acid addition salts thereof.

17. A compound of claim 4 selected from the group consisting of 5-(2-ethoxyethoxy)-2-(5-nitro-1-methyl-2-imidazolyl-methylene)-1-indanone, 5-(2-hydroxyethoxy)-2-(5-nitro-1-methyl-2-imidazolyl-methylene)-1-indanone, 5-(2-chloroethoxy)-2-(5-nitro-1-methyl-2-imidazolyl-methylene)-1-indanone, and 5-(2-acetoxyethoxy)-2-(5-nitro-1-methyl-2-imidazolyl-methylene)-1-indanone and the pharmaceutically acceptable acid addition salts thereof.

18. A compound of claim 4 selected from the group consisting of 5-acetylamino-2-(5-nitro-1-methyl-2-imidazolyl-methylene)-1-indanone, 5-amino-2-(5-nitro-1-methyl-2-imidazolyl-methylene)-1-indanone, 5-acetamino-2-(5-nitro-1-ethyl-2-imidazolyl-methylene)-1-indanone, 5-amino-2-(5-nitro-1-ethyl-2-imidazolyl-methylene)-1-indanone, 5-acetamino-2-(5-nitro-1-butyl-2-imidazolyl-methylene)-1-indanone, 5-amino-2-[5-nitro-1-(2-hydroxyethyl)-2-imadozyl-methylene]-2-indanone, 5-p-toluenesulfonylamino-2-(5-nitro-1-methyl-2-imidazolyl-methylene)-1-indanone, 5-acetamino-2-[5-nitro-1-(2-acetoxyethyl)-2-imadazoyl-methylene]-1-indanone and 5-amino-2-(5-nitro-1-butyl-2-imidazolyl-methylene)-1-indanone and the pharmaceutically acceptable acid addition salts thereof.

19. A compound of claim 4, 5-(2-dimethylaminoethoxy)-2-(5-nitro-1-methyl-2-imidazolyl-methylene)-1-indanone and the pharmaceutically acceptable acid addition salts thereof.

20. A compound of claim 4, 5-(2-diethylaminoethoxy)-2-(5-nitro-1-methyl-2-imidazolyl-methylene)-1-indanone and the pharmaceutically acceptable acid addition salts thereof.

21. A compound of claim 4, 5-(2-pyrrolidinoethoxy)-2-(5-nitro-1-methyl-2-imidazolyl-methylene)-1-indanone and the pharmaceutically acceptable acid addition salts thereof.

22. A compound of claim 4, 5-(2-piperidinoethoxy)-2-(5-nitro-1-methyl-2-imidazolyl-methylene)-1-indanone and the pharmaceutically acceptable acid addition salts thereof.

23. A compound of claim 4, 5-[2-(4-methyl-piperazino)-ethoxy]2-(5-nitro-1-methyl-2-imidazolyl-methylene)-1-indanone and the pharmaceutically acceptable acid addition salts thereof.

24. A compound of claim 4, 5-(2-morpholinoethoxy)-2-(5-nitro-1-methyl-2-imidazolyl-methylene)-1-indanone and the pharmaceutically acceptable acid addition salts thereof.

25. A compound of claim 4, 5-[2-(1-perhydroazepinyl)-ethoxy]-2-(5-nitro-1-methyl-2-imidazolyl-methylene)-1-indanone and the pharmaceutically acceptable acid addition salts thereof.

26. A compound of claim 4, 4-(2-dimethylaminoethoxy)-2-(5-nitro-1-methyl-2-imidazolyl-methylene)-1-indanone and the pharmaceutically acceptable acid addition salts thereof.

27. A compound of claim 4, 5-dimethylamino-2-(5-nitro-1-methyl-2-imidazolyl-methylene)-1-indanone and the pharmaceutically acceptable acid addition salts thereof.

28. A compound of claim 5 selected from the group consisting of 6-methoxy-2-(5-nitro-1-methyl-2-imidazolyl-methylene)-1-tetralone, 6-acetylamino-2-(5-nitro-1-methyl-2-imidazolyl-methylene)-1-tehalone, 6-methanesulfonyloxy-2-(5-nitro-1-methyl-2-imidazolyl-methylene)-1-tetralone, 6-hydroxy-2-(5-nitro-1-methyl-2-imidazoyl-methylene)-1-tetralone, 2-(5-nitro-1-methyl-2-imidazolyl-methylene)-1-tetralone, 5-hydroxy-6,7-dimethoxy-2-(5-nitro-1-methyl-2-imidazolyl-methylene)-1-tetralone, 6-amino-2-(5-nitro-1-methyl-2-imidazoyl-methylene)-1-tetralone, 5,7-dimethyl-2-(5-nitro-1-methyl-2-imidazolyl-methylene)-1-tetralone, 6-dimethylamino-2-(5-nitro-1-methyl-2-imidazolyl-methylene)-1-tetralone, 6-(2-acetoxyethoxy)-2-(5-nitro-1-methyl-2-imidazolyl-methylene)-1-tetralone, 6-methylamino-2-(5-nitro-1-methyl-2-imidazolyl-methylene)-1-tetralone, 6-(2-hydroxyethoxy)-2-(5-nitro-1-methyl-2-imidazolyl-methylene)-1-tetralone, and 6-(2-p-toluenesulfonyloxyethoxy)-2-(5-nitro-1-methyl-2-imidazolyl-methylene)-1-tetralone and the pharmaceutically acceptable acid addition salts thereof.

29. A compound of claim 5, 6-(2-dimethylaminoethoxy)-2-(5-nitro-1-methyl-2-imidazolyl-methylene)-1-tetralone and the pharmaceutically acceptable acid addition salts thereof.

30. A compound of claim 5, 6-(2-morpholinoethoxy)-2-(5-nitro-1-methyl-2-imidazolyl-methylene)-1-tetralone and the pharmaceutically acceptable acid addition salts thereof.

31. A compound of claim 5, 6-(2-pyrrolidinoethoxy)-2-(5-nitro-1-methyl-2-imidazolyl-methylene)-1-tetralone and the pharmaceutically acceptable acid addition salts thereof.

32. A compound of claim 6 selected from the group consisting of 6-hydroxy-2-(5-nitro-1-methyl-2-imidazolyl-methylene)-3-benzofuranone, 6,7-dimethoxy-2-(5-nitro-1-methyl-2-imidazolyl-methylene)-3-benzofuranone, 7-chloro-4,6-dimethoxy-2-(5-nitro-1-methyl-2-imidazolyl-methylene)-3-benzofuranone, and 5-chloro-4,6-dimethyl-2-(5-nitro-1-methyl-2-imidazolyl-methylene)-3-benzofuranone and 6-acetoxy-2-(5-nitro-1-methyl-2-imidazolylmethylene)-3-benzofuranone and the pharmaceutically acceptable acid addition salts thereof.

33. A compound of claim 7 selected from the group consisting of 7-methoxy-2-(5-nitro-1-methyl-2-imidazolyl-methylene)-4-thiachromanone, 3-(5-nitro-1-methyl-2-imidazolyl-methylene)-4-thiachromanone, and 5-methoxy-2-(5-nitro-1-methyl-2-imidazolyl-methylene)-4-thiachromanone-1-oxide and the pharmaceutically acceptable acid addition salts thereof.

34. A compound of claim 1, 2-(5-nitro-1-methyl-2-imidazolyl-methylene)-thioindoxyl.

35. A compound of claim 1, 2-(5-nitro-1-methyl-2-imidazolyl-methylene)-thioindoxyl-1,1-dioxide.

36. A compound of claim 1, 2-(5-nitro-1-methyl-2-imidazolyl-methylene)-thioindoxyl-1-oxide.

37. A compound of claim 1, 3-(5-nitro-1-methyl-2-imidazolyl-methylene)-4-isothiachromanone.

38. A compound of claim 1 selected from the group consisting of 3-(5-nitro-1-methyl-2-imidazolyl-methylene)-4-chromanone, 7-acetoxy-3-(5-nitro-1-methyl-2-imidazolyl-methylene)-4-chromanone and 7-hydroxy-3-(5-nitro-1-methyl-2-imidazoyl-methylene-4-chromanone and the pharmaceutically acceptable acid addition salts thereof.

39. A compound of claim 8 selected from the group consisting of 2-(5-nitro-1-methyl-2-imidazolyl-methylene)-acetophenone, 4'-hydroxy-2-(5-nitro-1-methyl-2-imidazolyl-methylene)-acetophenone, 4'-(2-acetoxyethoxy)-2-(5-nitro-1-methyl-2-imidazolyl-methylene)-acetophenone, 4'-(2-hydroxyethoxy)-2-(5-nitro-1-methyl-2-imidazoyl-methylene)-acetophenone, 4'-(2-p-toluenesulfonyloxyethoxy)-2-(5-nitro-1-methyl-2-imidazolyl-methylene)-acetophenone, 4'-methyl-3'-hydroxy-2-(5-nitro-1-methyl-2-imidazolyl-methylene)-acetophenone, 3',4'-dihydroxy-2-(5-nitro-1-methyl-2-imidazolyl-methylene)-acetophenone, 2',4'-dimethoxy-2-(5-nitro-1-methyl-2-imidazolyl-methylene)-acetophenone and 4'-(2-chloroethoxy)-2-(5-nitro-1-methyl-2-imidazolyl-methylene)-acetophenone and the pharmaceutically acceptable acid addition salts thereof.

40. A compound of claim 8 selected from the group consisting of 4'-acetylamino-2-(5-nitro-1-methyl-2-imidazolyl-methylene)-acetophenone, 4'-amino-2-(5-nitro-1-methyl-2-imidazolyl-methylene)-acetophenone and 4'-dimethylamino-2-(5-nitro-1-methyl-2-imidazolyl-methylene)-acetophenone and the pharmaceutically acceptable acid addition salts thereof.

41. A compound of claim 8, 4'-(2-morpholinoethoxy)-2-(5-nitro-1-methyl-2-imidazolyl-methylene)-acetophenone and the pharmaceutically acceptable acid addition salts thereof.

42. A compound of claim 8, 4'-(2-pyrrolidinoethoxy)-2-(5-nitro-1-methyl-2-imidazolyl-methylene)-acetophenone and the pharmaceutically acceptable acid addition salts thereof.

43. A compound of claim 8, 4'-(2-dimethylaminoethoxy)-2-(5-nitro-1-methyl-2-imidazolyl-methylene)-acetophenone and the pharmaceutically acceptable acid addition salts thereof.

44. A compound of claim 1 wherein X is saturated or unsaturated alkyl of 1–5 carbon atoms, 2-hydroxyethyl, 2-benzoyloxyethyl, or 2-alkanoyloxyethyl wherein alkanoyl is of 2–3 carbon atoms; $R_1$ is hydrogen, halogen, alkyl of 1–5 carbon atoms, a hydroxy, alkanoyloxy group of 2–3 carbon atoms, or saturated or unsaturated alkoxy group of 1–5 carbon atoms; and $R_2$ is hydrogen, halogen, alkyl of 1–5 carbon atoms, a hydroxy, alkanoyloxy of 2–3 carbon atoms, saturated or unsaturated alkoxy group of 1–5 carbon atoms, cinnamoyloxy, alkylsulfonyloxy group of 1–2 carbon atoms, p-toluenesulfonyloxy, benzyloxy, amino, alkanoylamino of 2–3 carbon atoms, benzoylamino, p-toluenesulfonylamino, monoamino or dialkylamino wherein alkyl is of 1–2 carbon atoms, benzylamino or an alkoxy group of 2–4 carbon atoms substituted in the terminal position by one of chlorine, hydroxy, alkanoyloxy of 2–3 carbon atoms, p-toluenesulfonyloxy, or

wherein A and B each are hydrogen, or saturated or unsaturated alkyl of 1–5 carbon atoms, or A and B collectively with the N-atom are pyrrolidino, piperidino, morpholino, piperazino, or piperazino substituted on the 4-position nitrogen atom by alkyl of 1–5 carbon atoms, hexa-methylenimino, heptamethylenimino or octamethylenimino, or a corresponding alkyleneimino group bridged directly or by lower alkylene.

45. A compound of claim 44 wherein X and Y each are hydrogen.

46. A compound of claim 44 wherein X and Y each collectively are $—CH_2—$.

47. A compound of claim 44 wherein X and Y each collectively are $—CH_2CH_2—$.

* * * * *

UNITED STATES PATENT OFFICE
CERTIFICATE OF CORRECTION

Patent No. 3,721,668          Dated March 20, 1973

Inventor(s) Clemens Rufer et al

It is certified that error appears in the above-identified patent and that said Letters Patent are hereby corrected as shown below:

Column 7, line 49, change "50°" to --5°--.

Column 13, line 12, change "-B249°" to -- -249° --.

Column 15, line 51, change "-BR198°" to -- -198° --.

Column 17, line 45, change "(2.5 mol)" to --(2.5 mmol)--.

Column 22, line 21, change "-B49°" to -- -49° --.

Column 24, line 49, after "(5" add --%--.

Column 27, line 67, change "-BR206°" to -- -206° --.

Column 31, line 49, change "hydroxyl" to -- hydroxy --.

Column 32, line 56, change "6mg." to --mg.--.

Column 38, line 27, change "tehalone," to --teralone,--.

Signed and sealed this 16th day of July 1974.

(SEAL)
Attest:

McCOY M. GIBSON, JR.
Attesting Officer

C. MARSHALL DANN
Commissioner of Patents